(12) United States Patent
Bozzato et al.

(10) Patent No.: US 10,477,875 B2
(45) Date of Patent: Nov. 19, 2019

(54) FLAVORING DEVICE

(71) Applicant: Electrolux Professionals S.p.A., Pordenone (IT)

(72) Inventors: Arianna Bozzato, Reana del Rojale (IT); Massimiliano Vignocchi, Pordenone (IT); Franco Tassan Mangina, Marsure (IT); Marino Fadelli, Colle Umberto (IT)

(73) Assignee: Electrolux Professional S.p.A., Pordenone (IT)

( * ) Notice: Subject to any disclaimer, the term of this patent is extended or adjusted under 35 U.S.C. 154(b) by 316 days.

(21) Appl. No.: 15/179,081

(22) Filed: Jun. 10, 2016

(65) Prior Publication Data

US 2016/0360763 A1    Dec. 15, 2016

(30) Foreign Application Priority Data

Jun. 11, 2015  (EP) .................................. 15171652

(51) Int. Cl.
| | | |
|---|---|---|
| *A23B 4/052* | (2006.01) | |
| *A23L 5/10* | (2016.01) | |
| *A21B 3/04* | (2006.01) | |

(52) U.S. Cl.
CPC .............. *A23B 4/0523* (2013.01); *A21B 3/04* (2013.01); *A23L 5/17* (2016.08); *A23B 4/052* (2013.01); *A23V 2002/00* (2013.01)

(58) Field of Classification Search
CPC ...... A23B 4/0523; A23L 5/17; A23V 2002/00
USPC ........................... 99/400, 446, 448, 481, 482
See application file for complete search history.

(56) References Cited

U.S. PATENT DOCUMENTS

| 1,813,008 | A | * | 7/1931 | Winkelmuller ........ A23B 4/052 |
| | | | | 99/476 |
| 7,157,668 | B2 | | 1/2007 | Bartelick |
| 8,304,697 | B2 | | 11/2012 | McGhee, Jr. et al. |
| 2005/0204934 | A1 | | 9/2005 | Robertson |
| 2010/0247721 | A1 | | 9/2010 | McGhee, Jr. et al. |

(Continued)

FOREIGN PATENT DOCUMENTS

EP    2009356 A1    12/2008

OTHER PUBLICATIONS

European Search Report issued in corresponding European Patent Application No. 15171652.9 dated Aug. 14, 2015, 7 pages.

*Primary Examiner* — Thien S Tran
(74) *Attorney, Agent, or Firm* — Pearne & Gordon LLP

(57) ABSTRACT

A flavoring device includes at least one flavoring casing having an air inlet opening arranged for allowing air to enter the flavoring casing, a flavoring air outlet opening arranged for allowing air to pass to a cooking chamber, and a flavoring air path fluidly connecting the air inlet opening to the flavoring air outlet opening. The flavoring casing houses, at least while in operation: a heating element arranged in the flavoring air path, and a flavoring substance rack arranged at least partially in the flavoring air path downstream the heating element. The heating element is housed spaced apart from the flavoring substance rack in such a way that, in operation, heat is transferred from the heating element to the flavoring substance rack mainly by air flowing inside the flavoring casing from the air inlet opening to the flavoring air outlet opening through the flavoring air path.

15 Claims, 21 Drawing Sheets

(56) References Cited

U.S. PATENT DOCUMENTS

2013/0239823 A1\* 9/2013 Re .......................... A23B 4/044
                                                    99/474
2017/0020148 A1\* 1/2017 Dixon ................ A47J 37/0629

\* cited by examiner

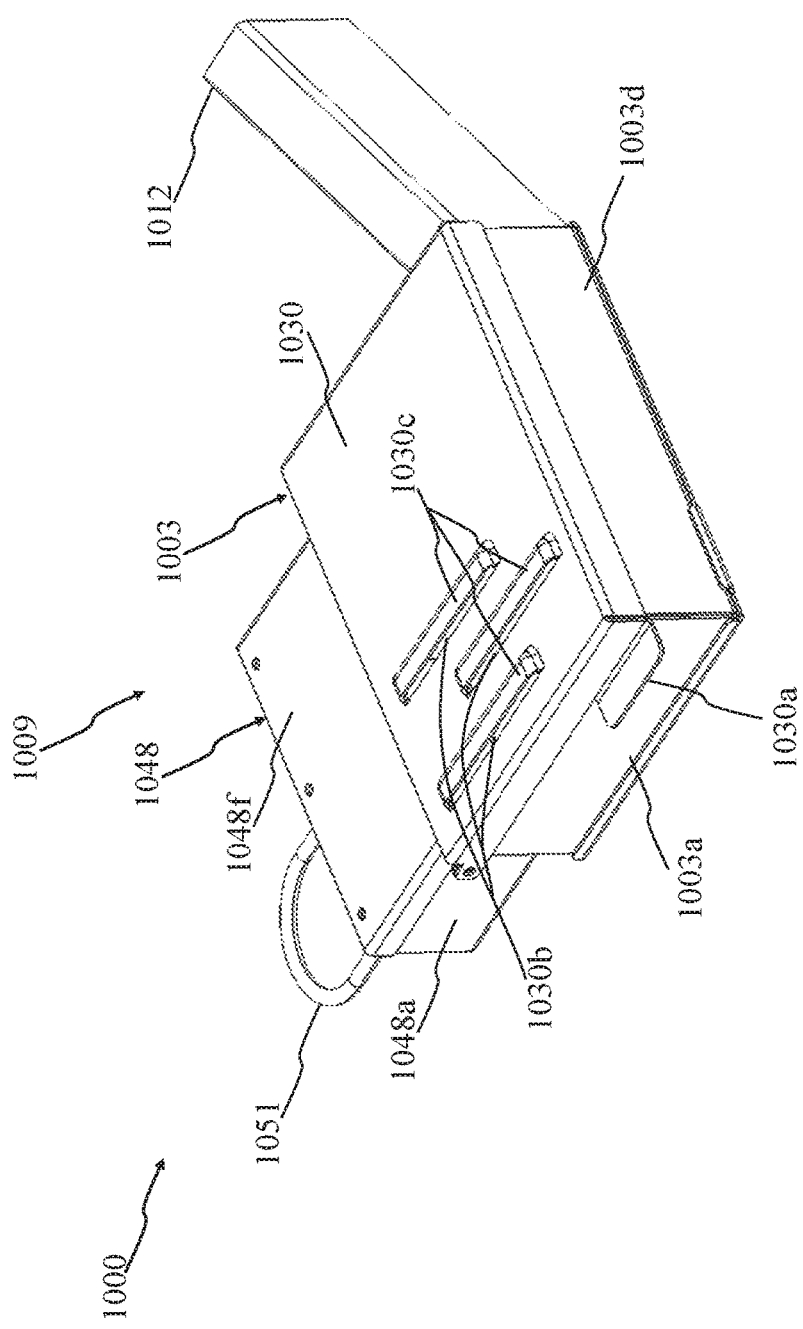

US 10,477,875 B2

FLAVORING DEVICE

FIELD OF THE INVENTION

The solution according to embodiments of the invention generally relates to household or professional electric appliances. More particularly, the solution relates to accessories for household or professional cooking ovens. Even more particularly, the solution relates to a flavoring box for flavoring and/or smoking foods disposed in a cooking chamber of the oven.

BACKGROUND OF THE INVENTION

Nowadays household and professional cooking ovens known in the art offer functionalities beyond a normal cooking or baking of foods disposed in a cooking chamber thereof. Particularly, a number of household and professional cooking ovens offer the functionality of smoking foods by using smoking substance such as aromatic wood chips either natural or chemically treated along with traditional cooking or baking of foods.

In order to achieve that, such cooking ovens typically comprise a smoking assembly which is in fluid communication with a cooking chamber of the cooking oven and that comprises an element, typically a heating element, for generating smoke from the combustion of the smoking substance. The smoke leaves the smoking assembly and reaches the cooking chamber of the cooking oven where it smokes the food contained therein.

For example, U.S. Pat. No. 7,157,668 discloses an oven having a first food preparation apparatus in the form of a convection heat source and/or a steam production assembly and/or a radiating heat source, and a second food preparation apparatus in the form of a smoking assembly. The oven can operate at least one of the food preparation apparatus simultaneously with the smoking assembly or separately from the smoking assembly.

U.S. Pat. No. 8,304,697 discloses a smoker device having a low profile fits beneath the lowermost rack of an oven thereby allowing full use of all possible shelves of the oven. The smoker device comprises a uniquely shaped bi-level heater element that allows the smoker device pan to be cradled just above the bottom wall of the oven chamber. A method and system allow a processor control of the smoker device manually or automatically as a part of a programmed recipe.

European Patent No. EP 2009356 discloses a smoke and electric heating oven that includes an oven muffle provided with a cavity therein, a smoke generator with a heating box installed in the cavity, and an outer casing. The oven muffle has at least one first heating element installed outside the cavity, and at least one second heating element installed in the cavity. The second heating element may extend into the heating box. The at least one first heating element can transmit heat to the receiving chamber to bake an object in the receiving chamber. The at least one second heating element can heat wooden chips that are placed in the heating box to produce smoke to smoke the baked object in the receiving chamber, thereby providing the oven with the function of baking with electric heat and smoking with wooden chips.

Conversely, the Applicant has found in the art no examples of household or professional appliance adapted to offer functionalities for flavoring foods by means of flavoring substances, such as for example flavoring herbs (e.g., rosemary, eucalyptus, thyme, lavender, sage, lemon balm, hop or mixtures thereof).

SUMMARY OF INVENTION

The Applicant has realized that the art do not provide a satisfactory solution for offering functionalities of flavoring foods disposed in a cooking chamber of a cooking oven.

Particularly, the Applicant has found that the known smoking devices are not suitable for performing a flavoring of foods disposed in a cooking chamber of a cooking oven. Indeed, known smoking devices, adapted to ignite and/or char wood pieces, would thoroughly burn flavoring substances, thus destroying any flavoring/aromatic molecules comprised in the flavoring substances and failing in flavoring foods disposed in a cooking chamber of the cooking oven.

The Applicant has tackled the problem of devising an improved solution able to overcome the above-discussed lack of smoking and/or flavoring foods functionalities for cooking ovens in the prior art, as well as, able to overcome the drawbacks mentioned above.

One or more aspects of the solution according to embodiments of the invention are set out in the independent claims, with advantageous features of the same solution that are indicated in the dependent claims.

An aspect of the solution according to one or more embodiments of the present invention relates to a flavoring device. The flavoring device is adapted to be associated with a cooking chamber of a cooking oven adapted to cook food stored therein. The flavoring device comprises at least one flavoring casing having an air inlet opening arranged for allowing air to enter said flavoring casing, a flavoring air outlet opening arranged for allowing air contained within said flavoring casing to pass to said cooking chamber, and a flavoring air path traversing said flavoring casing and fluidly connecting said air inlet opening to said flavoring air outlet opening. The flavoring casing houses, at least while in operation: a heating element arranged in said flavoring air path for heating the air flowing through said flavoring air path, and a flavoring substance rack arranged at least partially in said flavoring air path downstream said heating element and adapted to contain at least one flavoring substance. Moreover, the heating element is housed spaced apart from the flavoring substance rack in such a way that, in operation, heat is transferred from said heating element to said flavoring substance rack mainly by air flowing inside the flavoring casing from the air inlet opening to the flavoring air outlet opening through said flavoring air path.

It is underlined that more than 50% of the heat that is transferred from the heating element to the flavoring substance rack is transferred by the hot air that moves from the heating element to the flavoring substance rack. It is not excluded that a part of heat is transferred from the heating element to the flavoring substance rack by other means, for example by radiation or by conduction, but the heating element is positioned with respect to the flavoring substance rack in such a way that this part of heat is anyway much lower than the part of heat transferred by the flowing air.

In an advantageous embodiment of the invention, said at least one casing houses, at least while in operation, a temperature sensor positioned in correspondence of the flavoring substance rack and spaced apart from said heating element.

In an advantageous embodiment of the invention, said at least one casing further comprises at least one air inlet duct protruding from said flavoring casing, said air inlet duct comprising the air inlet opening and being arranged for allowing air to enter said flavoring casing.

In an advantageous embodiment of the invention, the flavoring device further comprises a smoking casing having an air inlet opening arranged for allowing air external to said smoking casing, to enter said smoking casing, a smoking air outlet opening arranged for allowing air contained within said flavoring casing to pass to said cooking chamber, and a smoking air path traversing said smoking casing and fluidly connecting said air inlet opening to said smoking air outlet opening. Said smoking casing housing, at least while in operation: a smoking substance rack arranged for receiving a smoking substance, said smoking substance rack is arranged at least partially in said smoking air path, and a heating element arranged for charring said smoking substance, the smoking substance rack being positioned in correspondence of said heating element in such a way that, in operation, heat is transferred from said heating element to said smoking substance rack mainly by radiation.

In an advantageous embodiment of the invention, said smoking casing is interchangeable with said flavoring casing.

In an advantageous embodiment of the invention, the smoking substance rack is arranged for subdividing a inner space of said smoking casing in a first compartment and a second compartment, said first compartment housing at least said smoking substance rack, and said second compartment housing, at least while in operation, said smoking substance.

In an advantageous embodiment of the invention, further comprising an actuating arrangement, said actuating arrangement comprising the heating element and the temperature sensor, and wherein the actuating arrangement is coupled with the flavoring casing or the smoking casing at least while in operation.

In an advantageous embodiment of the invention, the actuating arrangement is configured for selectively controlling the operation of the heating element on the basis of temperature measurements obtained from the temperature sensor.

In an advantageous embodiment of the invention, the actuating arrangement further comprises a support element for supporting the flavoring casing and/or the smoking casing at least while in operation.

In an advantageous embodiment of the invention, the actuating arrangement further comprises a locking element and wherein the flavoring casing and/or the smoking casing further comprise a receiving element, the locking element being configured for engaging with the receiving element for firmly coupling the actuating arrangement with the flavoring casing and/or the smoking casing.

In one advantageous embodiment of the invention, the flavoring device is arranged for operating also as the smoking casing, and at least while in operation inside the cooking chamber of a cooking oven, the flavoring casing further houses a smoking substance rack adapted to contain at least one smoking substance, the smoking substance being positioned in correspondence of said heating element in such a way that, in operation, heat is transferred from said heating element to said smoking substance rack mainly by convection and/or radiation.

In one advantageous embodiment of the invention, the flavoring device is arranged for operating also as the smoking casing, and said air outlet opening connected to said air inlet opening by said smoking air path is a smoking air outlet opening distinct from said flavoring air outlet opening and wherein said casing comprises a shutter element arranged for selectively obstruct said flavoring air path or said smoking air path, in order to selectively fluidly connecting said air inlet opening respectively to said flavoring air outlet opening or to said smoking air outlet opening.

In one advantageous embodiment of the invention, the heating element is fixed to said flavoring and/or smoking casing, so that said heating element is fixed to said flavoring and/or smoking casing even when not in operation.

In one advantageous embodiment of the invention, the temperature sensor is fixed to said flavoring and/or smoking casing, so that said temperature sensor is fixed to said flavoring and/or smoking casing even when not in operation.

In one advantageous embodiment of the invention, the heating element and the temperature sensor are operatively connected to a remote control unit configured for controlling the operation of the heating element on the basis of temperature measurements obtained from the temperature sensor.

In an advantageous embodiment of the invention, the flavoring casing comprises a first coupling aperture for receiving, when in operation inside or outside the cooking chamber of a cooking oven and in fluid communication with the cooking chamber of the cooking oven, the heating element.

In one advantageous embodiment of the invention, the smoking casing comprises a first coupling aperture for receiving, when in operation inside the cooking chamber of a cooking oven, said the heating element.

In one advantageous embodiment of the invention, the heating element is a part of said cooking chamber of the cooking oven.

In an advantageous embodiment of the invention, the flavoring casing comprises a second coupling aperture for receiving, when in operation, the temperature sensor.

In an advantageous embodiment of the invention, the flavoring device further comprises at least one outlet duct coupled with the flavoring casing or the smoking casing at least while in operation, said outlet duct being configured for fluidly connecting the flavoring casing or the smoking casing with the cooking chamber of the cooking oven.

In one embodiment of the present invention, the temperature sensor is a part of said cooking chamber of the cooking oven.

In one advantageous embodiment of the invention, the flavoring device is arranged for operating also as the smoking casing, and the flavoring casing comprises a first compartment adapted to house the heating element and a second compartment adapted to house the flavoring substance rack, the first compartment and the second compartment being in fluid communication one with the other via said first air path.

Another aspect of the present invention proposes a cooking oven comprising a cooking chamber adapted to cook food stored therein, a components portion for housing components that allow and control an operation of the cooking oven and a heating element provided within the cooking chamber. Moreover, the heating element is adapted to be inserted in the flavoring device of above through the first coupling aperture.

In one embodiment of the present invention, the cooking oven further comprises a temperature sensor adapted to be inserted into the flavoring device of above through the second coupling aperture.

In one embodiment of the invention, the cooking oven further comprises an air circulating element for providing a circulating airflow within the cooking chamber, and in operation, the flavoring device is positioned within the cooking chamber in such a way that the circulating airflow is blown by the air circulating element towards the air inlet opening of the casing.

In one advantageous embodiment of the invention, the components portion of the cooking oven is configured to control an operation of the heating element on the basis of temperature measurements obtained from the temperature sensor.

In one advantageous embodiment of the invention, the cooking oven comprises air circulating element for providing a circulating airflow within the cooking chamber, and the method further comprises: forcing an airflow in said flavoring air path through the air inlet opening.

Another aspect of the present invention proposes a method of controlling the operation of a flavoring device positioned inside or outside a cooking chamber of a cooking oven and in fluid communication with the cooking chamber of the cooking oven, the flavoring device comprising at least a flavoring casing and at least a flavoring air path traversing said casing and fluidly connecting an air inlet opening of said casing to a flavoring air outlet opening of said casing. The method comprises providing a flavoring substance in said flavoring air path. The method further comprises the step of heating the air in said flavoring air path upstream said flavoring substance, in such a way that heated air, moving through said flavoring air path, heats said flavoring substance, so as to volatilize/vaporize its flavoring molecules, and takes volatilized/vaporized flavoring molecules into said cooking chamber via said flavoring air outlet opening.

In one embodiment of the present invention, the method further comprises the steps of detecting a temperature of the air in said flavoring air path, and controlling the heating of the air in said flavoring air path according to the detected temperature of the air in said flavoring air path.

BRIEF DESCRIPTION OF THE ANNEXED DRAWINGS

These and other features and advantages of the present invention will be made apparent by the following description of some exemplary and non limitative embodiments thereof. For its better intelligibility, the following description should be read making reference to the attached drawings, wherein:

FIGS. 10A-10G are various views of a flavoring device according to an alternative advantageous embodiment of the present invention.

DETAILED DESCRIPTION OF PREFERRED EMBODIMENTS OF THE INVENTION

Figure 1:
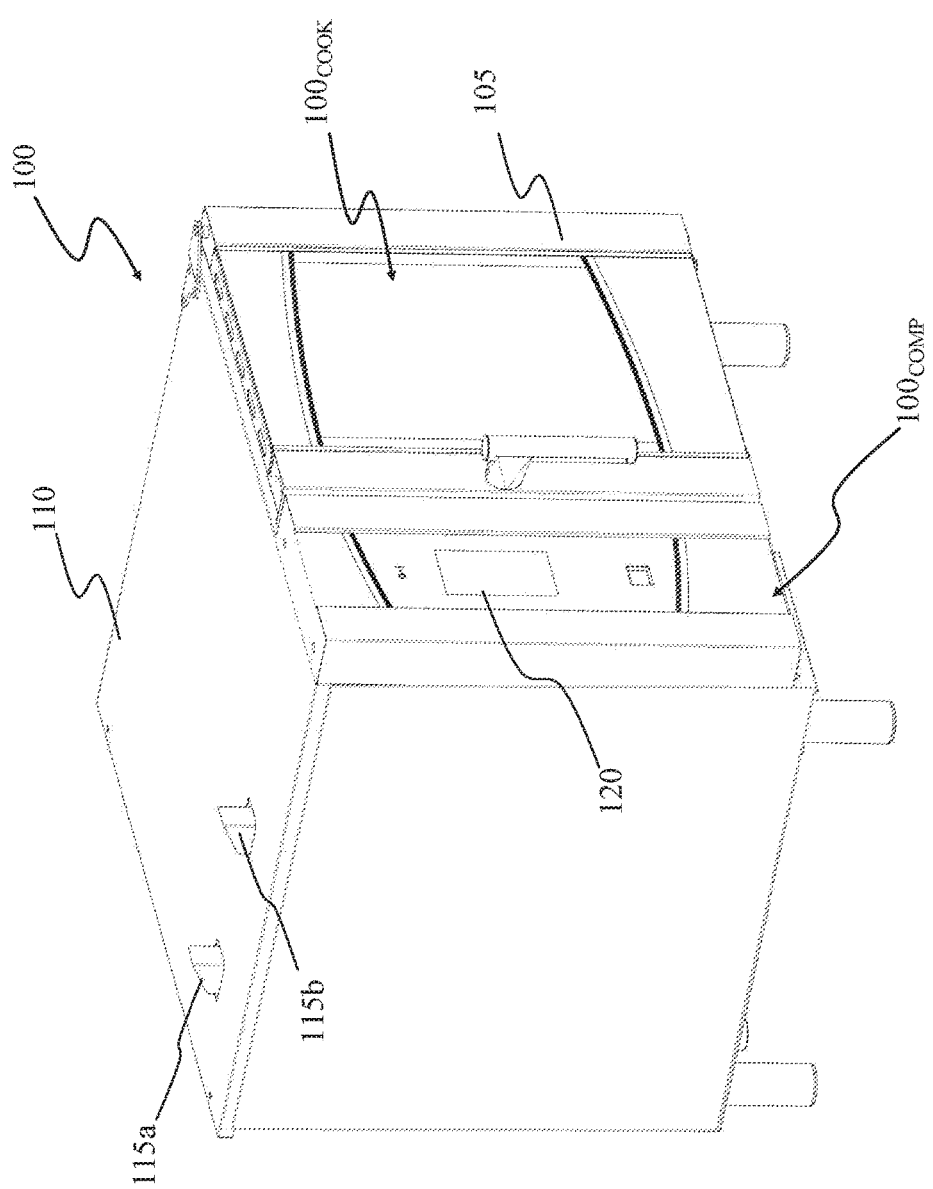
FIG. 1 is a perspective view of a cooking oven according to an advantageous embodiment of the invention.

Referring now to the drawings, FIG. 1 schematically shows a perspective side view, with removed parts, of a cooking oven 100 according to an embodiment of the invention. In the exemplary embodiment here considered, a freestanding professional cooking oven 100 is disclosed, but the principles of the invention may also be applied to built-in (household or professional) cooking ovens and to freestanding household cooking ovens. The cooking oven 100 may be a steam oven allowing food cooking by steam, or, as herein assumed by way of example only, a combined cooking oven selectively allowing conventional food cooking (e.g., food cooking by heat convection), food cooking by steam, or combinations thereof.

The cooking oven 100 advantageously comprises a cooking section $100_{COOK}$ for food cooking, and a components section $100_{COMP}$, preferably positioned alongside the cooking section $100_{COOK}$, housing some of the components that allow operation of the cooking oven 100 and control of food cooking.

The cooking section $100_{COOK}$ comprises a cooking chamber (not visible in FIG. 1, and numbered 315 in FIGS. 3A and 3B) for housing the food to be cooked, and, at a cooking oven front, a door 105 (shown in a closed configuration in FIG. 1) for selectively allowing/preventing access to the cooking chamber.

The components section $100_{COMP}$ advantageously comprises a number of well-known electronic, mechanical and/or electro-mechanical components for allowing food cooking (such as a steam generator) that, for the sake of description ease and conciseness, are not herein further disclosed.

Moreover, a control arrangement (not visible in FIG. 1), preferably housed in the components section $100_{COMP}$, is advantageously provided for controlling the cooking oven 100 operation (e.g., on the basis of instructions stored in a memory comprised in the control arrangement). The control arrangement may comprise any suitable electronic and/or electromechanical devices.

The components section $100_{COMP}$ may also advantageously house vents 115a and 115b, preferably provided on a top cover 110, for drawing fresh air in the cooking oven 100 and for exhausting the cooking fumes from the cooking chamber outside the cooking oven 100.

Preferably, the components section $110_{COMP}$ may comprise a control panel 120, preferably provided at the cooking oven front alongside the door 105, allowing a user to set desired cooking parameters (e.g., cooking temperature, cooking time, and/or cooking programs) and displaying cooking information.

Figure 2A:
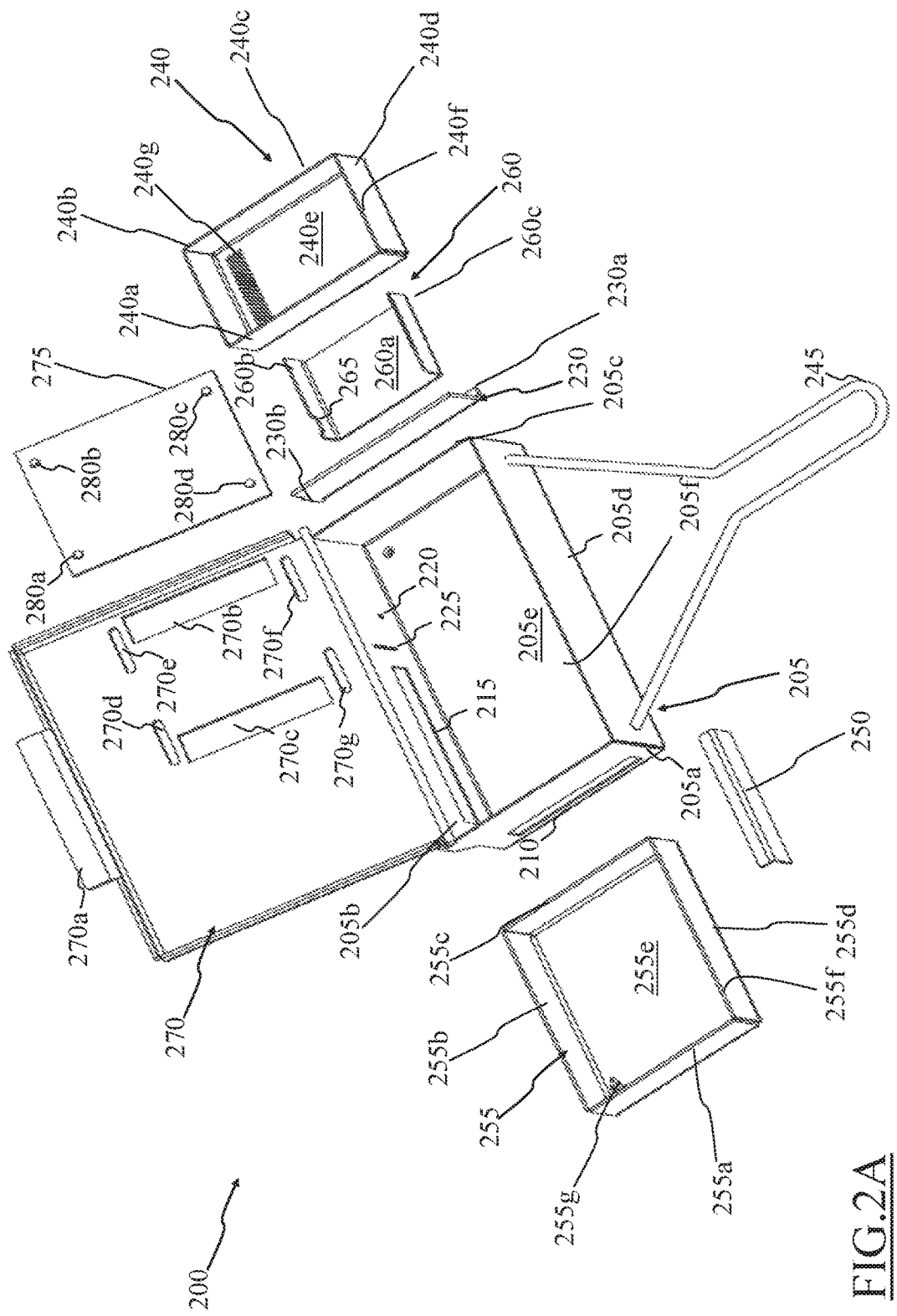
FIG. 2A is a perspective view of a flavoring device according to an embodiment of the present invention partly disassembled.
Figure 2B:
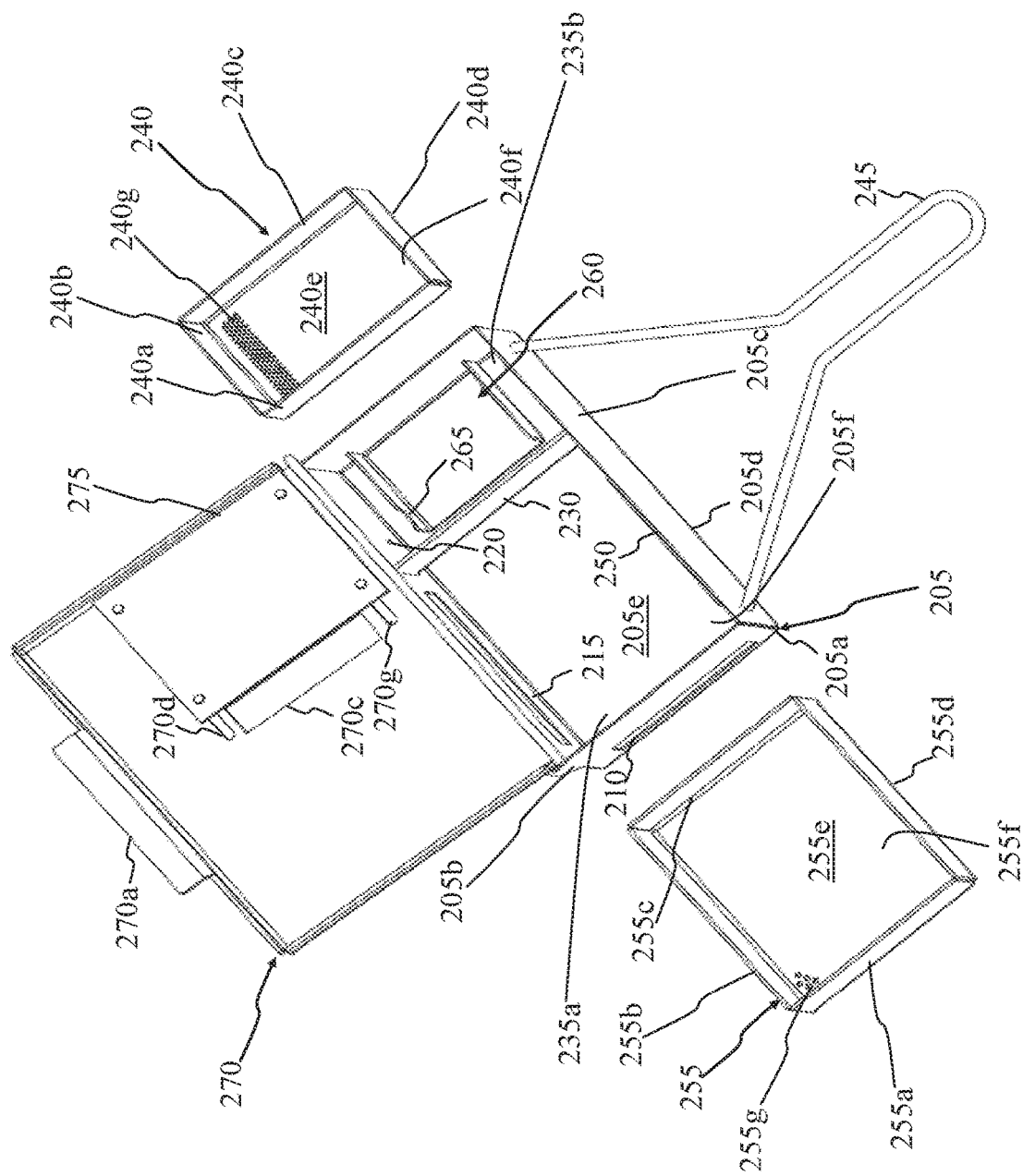
FIG. 2B is a perspective view of the flavoring device of FIG. 2A partly assembled.

Considering FIGS. 2A and 2B, they are perspective views of a flavoring device 200 according to an embodiment of the present invention.

The flavoring device 200 advantageously comprises a casing 205, which is preferably box-like and parallelepiped shaped.

The casing 205 generally comprises four sidewalls 205a-d, preferably two of which, i.e. the sidewalls 205a and 205c in the example of FIGS. 2A and 2B, shorter than the other two, i.e. the sidewalls 205b and 205d in the example of FIGS. 2A and 2B, and a bottom wall 205e, advantageously opposite to a main aperture 205f of the casing 205.

An air inlet opening 210, e.g. a slot, is provided, preferably on a first sidewall 205a of the four sidewalls 205a-d of the casing 205. Preferably, the air inlet opening 210 has a length substantially greater than its height. Even more preferably, the air inlet opening 210 has a length substantially comparable with the length of the first sidewall 205a (e.g., the length of the air inlet opening 210 is equal to, or greater than, the 80% of the length of the first sidewall 205a).

A first coupling aperture 215 and, preferably although not strictly necessarily, a second coupling aperture 220 are provided, preferably on a second sidewall 205b of the four sidewalls 205a-d of the casing 205a.

The second sidewall 205b is preferably adjacent to the first sidewall 205a with the first coupling aperture 215 that is preferably provided on the second sidewall 205b closer to the first sidewall 205a than the second coupling aperture 220. Thanks to such a structure, the first coupling aperture 215 is closer to the air inlet aperture 215 on the first sidewall 205 than the second coupling aperture 220.

The first coupling aperture 215 is sized in such a way to receive a heating element 305 (shown in FIGS. 3A and 3B) described in detail in the following. In the non limiting example of FIGS. 2A and 2B, the first coupling aperture 215 is advantageously a rectangular slot having a length substantially greater than its height.

The second coupling aperture 220 is sized in such a way to receive a sensor element 310 (shown in FIGS. 3A and 3B) described in detail in the following. In the non limiting example of FIGS. 2A and 2B, the second coupling aperture 220 is an advantageously substantially circular bore.

In an advantageous embodiment of the invention, between the first coupling aperture 215 and the second coupling aperture 220 a joining slit 225 is provided. The joining slit 225 is sized for receiving a protruding portion 230a of a separating element 230 provided within the casing 205. In the non limiting example of FIGS. 2A and 2B, the joining slit 225 is a rectangular slot having a height substantially greater than its length.

The separating element 230, when positioned within the casing 205, separates the space within the casing 205 in two separated compartments 235a and 235b, in fluid communication one with the other.

A first separated compartment 235a of the two separated compartments 235a and 235b preferably comprises the air inlet opening 210 and the first coupling aperture 215, while a second separated compartment 235b of the two separated compartments 235a and 235b preferably comprises the second coupling aperture 220.

The separating element 230 is preferably substantially parallelepiped shaped, having a length equal to a distance between the second sidewall 205b and a third sidewall 205c of the four sidewalls 205a-d of the casing 205 (i.e., slightly smaller than a length of the first sidewall 205a and of a fourth sidewall 205d of the four sidewalls 205a-d of the casing 205). The height of the separating element 230 is preferably smaller than the height of the four sidewalls 205a-d of the casing 205 for defining an aperture in a lower portion of the casing 205 that allows a fluid communication between the two separated compartments 235a and 235b (as can be appreciated in FIGS. 6A and 6B, and FIGS. 7A and 7B).

Preferably, although not necessarily, the separating element 230 comprises a support end 230b, preferably perpendicular to a main body of the separating element 230, provided for supporting a flavoring substance rack 240 (described in detail in the following). The support end 230b of the separating element 230 extends itself in the second portion 235b, when the separating element 230 is coupled with the casing 205, with the protruding portion 230a of the separating element 230 fitted in the joining slit 225.

The flavoring device 200 preferably comprises a handle element 245, advantageously coupled with the casing 205 in order to allow a secure seizure of the flavoring device 200 by a user. Preferably, the handle element 245 is coupled with an outer surface of the fourth sidewall 205b opposite to the second sidewall 205b on which the first and second coupling apertures 215 and 220 are preferably provided.

In an embodiment of the invention, the handle element 245 may be removably coupled with the casing 205.

Preferably, within the casing 205 a first support element 250 for supporting a smoking substance rack 255 is provided.

Preferably, within the casing 205 a second support element 260 for supporting the flavoring substance rack 240 is provided.

In an advantageous embodiment of the invention, the first support element 250 comprises two substantially rectangular portions, preferably one equal to the other. The two substantially rectangular portions are preferably perpendicularly coupled one with the other along one of their longer sides.

The first support element 250 is advantageously coupled with an inner surface of the fourth sidewall 205d opposite to the second sidewall 205b in such a way to form a cantilever structure protruding from the fourth sidewall 205d towards the inside of the casing 205 and preferably above the air inlet opening 210 on the first sidewall 205a of the casing 205. The first support element 250 is advantageously provided facing the first coupling aperture 215 and, thus, the first support element 250 advantageously results to be comprised in the first separated compartment 235a in which the inside of the casing 205 is divided by the separating element 230.

The smoking substance rack 255, if advantageously provided, is preferably box-like and more preferably parallelepiped shaped, advantageously with four sidewalls 255a-d and a bottom wall 255e opposite to a main aperture 255f. The bottom wall 255e of the smoking substance rack 255 is advantageously provided with a plurality of through bores 255g. Preferably, the plurality of through bores 255g covers the whole bottom wall 255e of the smoking substance rack 255.

The smoking substance rack 255 is adapted to contain a smoking substance such as for example wood chips (e.g., oak wood chips, cherry wood chips etc.).

The smoking substance rack 255 is advantageously adapted to removably fit the first separated compartment 235a of the casing, preferably resting on the first support element 250, over the heating element 305 (when the latter is inserted in the casing 205 through the first coupling aperture 215 as described in the following), above the air inlet opening 210 on the first sidewall 205a of the casing 205.

In an advantageous embodiment of the invention, the second support element 260 comprises a substantially rectangular main body 260a with two flaps 260b and 260c protruding, advantageously perpendicularly, preferably from opposite short sides of main body 260a of the support element 260. The two flaps 260b and 260c have advantageously substantially a same size, and protrude from the main body 260a in a same direction. In addition, preferably, at least one of the flaps 260b and 260c, the flap 260b in FIGS. 2A and 2B, comprises also a niche 265 for allowing the passage of the sensor element 310.

The second support element 260 is advantageously coupled with the bottom wall 205e of the casing 205, preferably by means of the main body 260a, in such a way that flaps 260b and 260c protrude towards the casing aperture 205f and with the niche 265 that is advantageously provided on the flap 260b and which is preferably aligned with the second coupling aperture 220. The second support element 260 advantageously results to be comprised in the second separated compartment 235b in which the inside of the casing 205 is divided by the separating element 230.

The flavoring substance rack 240 is preferably box-like and more preferably parallelepiped shaped, advantageously with four sidewalls 240a-d and a bottom wall 240e opposite to a main aperture 240f. The bottom wall 240e of the flavoring substance rack 240 is provided with a plurality of through bores 240g. Preferably, the plurality of through bores 240g covers the whole bottom wall 240e of the flavoring substance rack 240.

The flavoring substance rack 240 is adapted to contain a flavoring substance such as for example rosemary, eucalyptus, thyme, lavender, sage, lemon balm, hop or other flavoring herbs and/or mixtures thereof.

The flavoring substance rack 240 is advantageously adapted to removably fit the second separated compartment 235b of the casing 205, preferably resting on the second support element 260 (i.e., on free ends of the flaps 260b and 260c) and on the supporting portion 230a of the separating element 230 above the sensor element 310 (when the latter is inserted in the casing 205 through the second coupling aperture 220, as described in the following).

The casing 205 of the flavoring device 200 further preferably comprises a lid 270, more preferably rotatably coupled with rest of the casing 205, to selectively closing the aperture 205f thereof. Preferably, the lid 270 is hinged to the second sidewall 205b of the casing 205 in order to be simply opened by a user, for example while holding the flavoring device 200 by means of handle element 245 (if advantageously provided). The lid 270, if advantageously rotatably coupled with the casing 205, may be pivoted from a closing position in that closes the aperture 205f of the casing 205 to an opening position that allows accessing the inside of the casing 205.

In other advantageous embodiments of the present invention (not shown), the flavoring device comprises a lid coupled with the rest of the casing 205 in a different manner, for example the lid can be slidably coupled with the rest of the casing 205.

Preferably, the lid 270 comprises a tab 270a, preferably provided opposite to the hinging (if advantageously provided) between the rest of the casing 205 and the lid 270, i.e. adjacent to the fourth sidewall 205d of the casing 205 when the lid 270 is in the closing position, for facilitating the user in opening the lid 270.

The lid 270 may advantageously comprise a first air outlet opening, alternatively also called flavoring outlet opening 270b in the following.

The lid 270 may advantageously comprise a second air outlet opening, alternatively also called smoking air outlet opening 270c in the following.

The smoking outlet opening 270c (if provided) may be advantageously provided in the lid 270 in such a way that when the latter is in the closing position the smoking outlet opening 270c is above the smoking substance rack 255 in the first portion 235a of the casing 205.

The flavoring air outlet opening 270b is advantageously provided in the lid 270 in such a way that, when the latter is in the closing position, the flavoring outlet opening 270b is above the flavoring substance rack 240 in the second portion 235b of the casing 205.

The lid 270 preferably comprises a plurality of sliding slots, four sliding slots 270d-g in the example of FIGS. 2A and 2B. The sliding slots 270d-g are provided in proximity of the smoking air outlet opening 270c and of the flavoring air outlet opening 270b.

A shutter element 275 is preferably provided, more preferably slidably coupled to the lid 270. Advantageously, the shutter element 275 is coupled to the lid 270 in such a way to selectively close one between the smoking air outlet opening 270c and the flavoring air outlet opening 270b.

In the example of FIGS. 2A and 2B, the shutter element 275 is advantageously a plate having a size adapted to cover one between the smoking air outlet opening 270c and the flavoring outlet opening 270b while leaving the other accessible.

The shutter element 275 is preferably slidably mounted to an inner surface of the lid 270 (i.e., the surface facing the inside of the casing 205 when the lid 270 is in the closing position), preferably by means of four sliding pins 280a-d (of which only one end coupled with the shutter element 275 is visible in the FIGS. 2A and 2B) each of which passes through a respective one of the four sliding slots 270d-g provided in the lid 270. In order to maintain the shutter element 275 slidably coupled with the lid 270, the sliding pins 280a-d preferably comprise a top end (visible in FIGS. 3A and 3B) exposed on an outer surface of the lid 270 (i.e., the surface opposite to the inside of the casing 205 when the lid 270 is in the closing position) and advantageously larger than a smaller dimension (i.e., between an height and a length) of the four sliding slots 270d-g (in order to sustain the shutter element 275 against the gravity when the lid 270 is in its closing position).

In other embodiments of the present invention, different shutter elements and means for coupling such shutter elements with the lid may be provided without departing from the scope of the present invention. For example, two independent shutter elements may be provided each one adapted to close a respective one between the flavoring air outlet opening and the smoking air outlet opening.

The flavoring device 200 is preferably made of a heat resistant material (i.e., a material that is not deformed and/or damaged at the operating temperatures of the cooking oven 100). For example, the flavoring device 200 may be made of a metal, such as steel. In this case, the casing 205, the support elements 250 and 260 (if advantageously provided), the separating element 230 (if advantageously provided), the racks 240 and 255 (if advantageously provided), the lid 270 and the shutter element 275 (if advantageously provided) may be manufactured by cutting, punching and folding a metal sheet, thus with a cheap and fast manufacturing procedure.

Figure 3A:
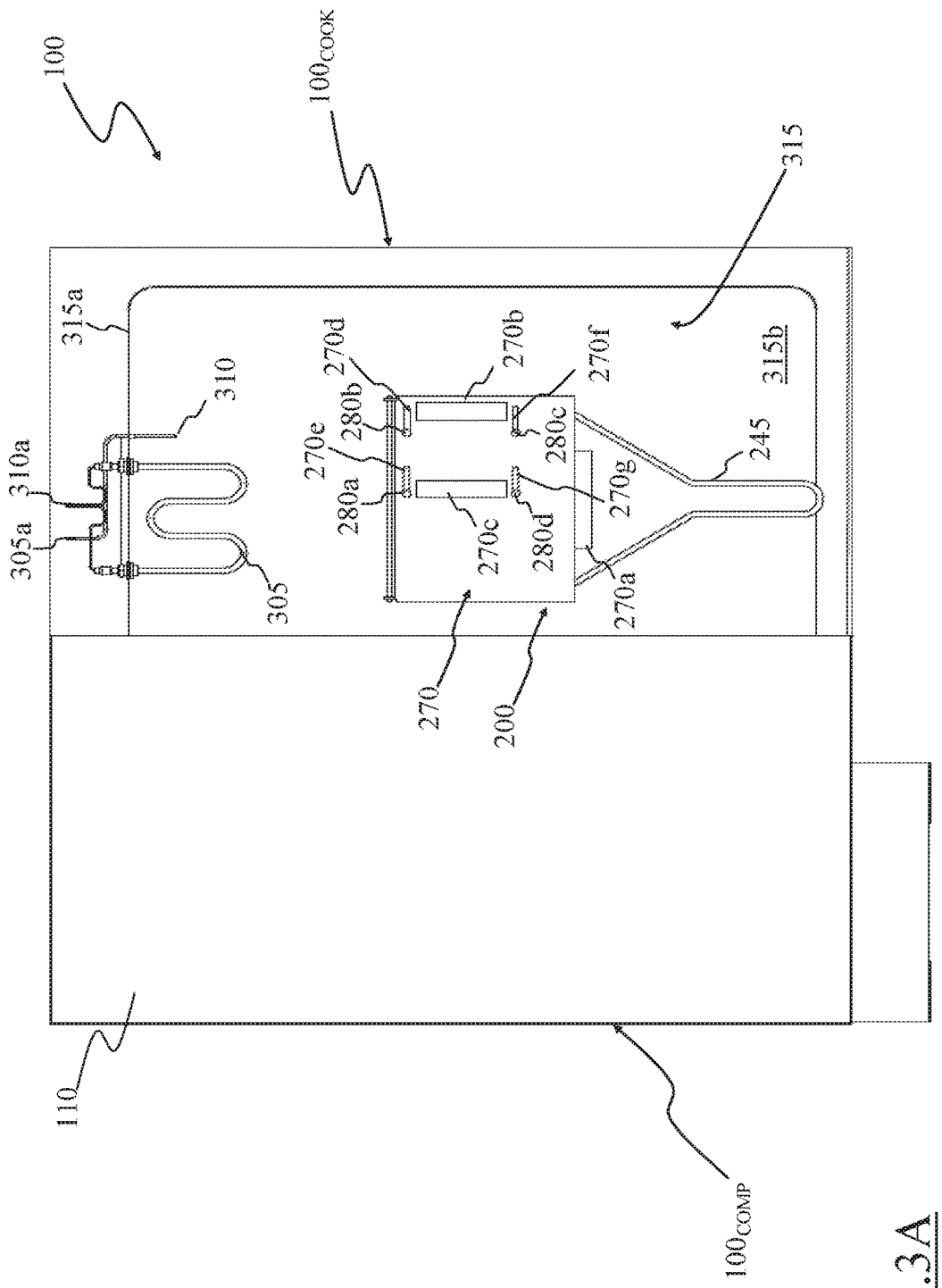
FIG. 3A is a schematic partly cross-sectional top view of the cooking oven of FIG. 1, shown without a door, receiving the flavoring device of FIGS. 2A and 2B in a cooking chamber thereof.
Figure 3B:
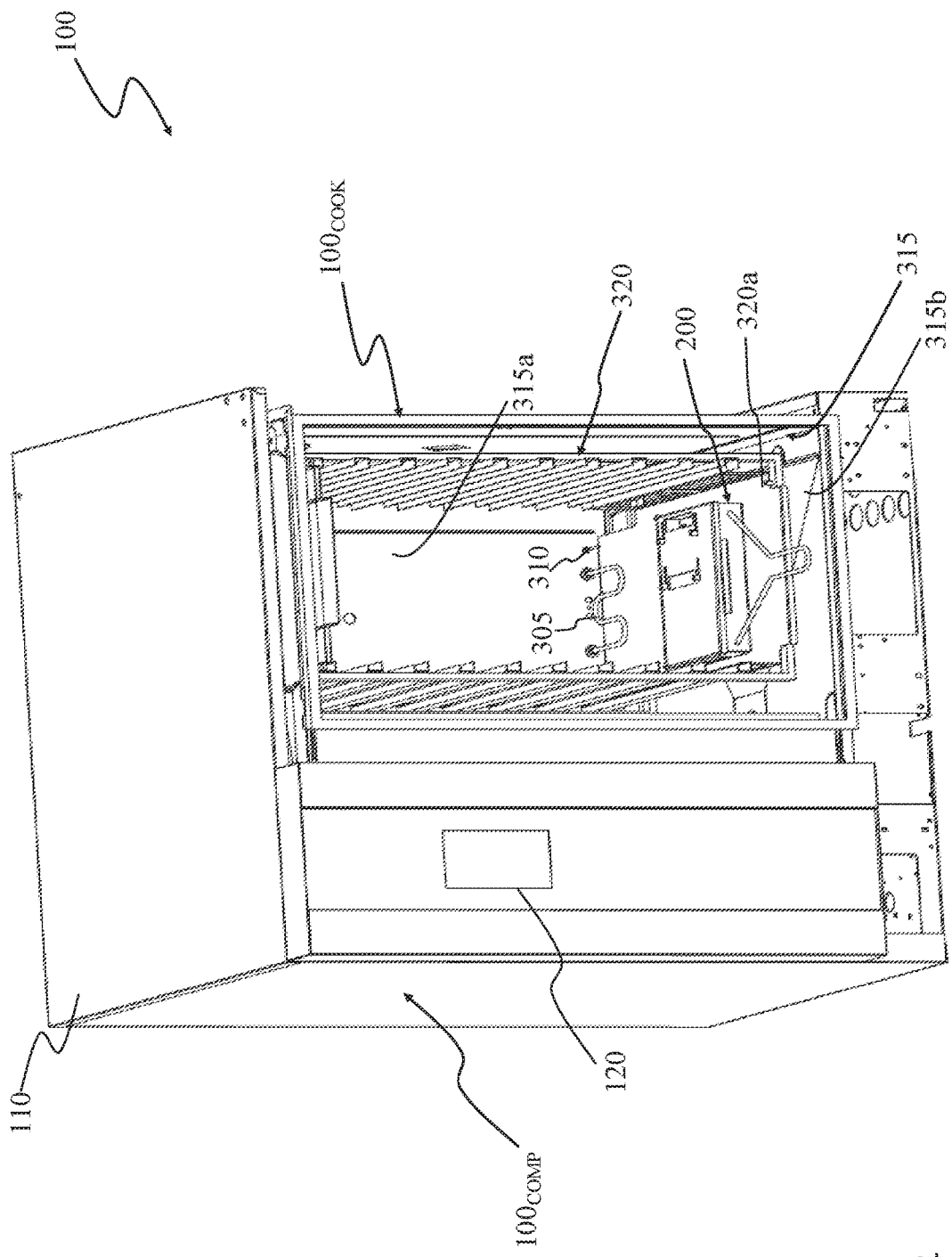
FIG. 3B is a perspective view of the cooking oven of FIG. 3A comprising a receiving rack for cooking plates.

Turning to FIGS. 3A and 3B, they are a schematic partly cross sectional top view of the cooking oven 100 shown without the door 125 receiving the flavoring device 200 in a cooking chamber 315 thereof, and a perspective view of the cooking oven 100 comprising a receiving rack 320 for cooking plates (not shown), respectively.

In the cooking oven 100 the heating element 305 is advantageously part of the cooking chamber 315 and preferably it protrudes at least partly from a backwall 315a thereof.

Preferably, although not necessarily, the cooking oven 100 comprises the sensor element 310 that is part of the cooking chamber 315 and advantageously protrudes at least partly from a backwall 315a thereof.

In the example of FIGS. 3A and 3B, the heating element 305 is advantageously an electric heating element exposed in the cooking chamber 315 of the cooking oven 100. Preferably, the heating element 305 has a serpentine structure. The heating element 305 is advantageously wired by (electric) power wirings 305a to a (electric) power element (not shown) of the cooking oven 100 for being selectively energized by it according to an energizing command provided by the control arrangement (not shown) of the cooking oven 100 (as described in the following). The power wirings 305a are preferably provided behind the backwall 315a of the coking chamber 315, thus, outside the latter.

In the example of FIGS. 3A and 3B, the sensor element 310 comprises a temperature sensor (e.g., a thermocouple). Preferably, the sensor element 310 has a rod-like structure. The sensor element 310 is wired by (electric) signal wirings 310a to the control arrangement (not shown) comprised in the components section $100_{COMP}$ of the cooking oven 100 for providing temperature information thereto (as described in the following). The signal wirings 310a are preferably provided behind the backwall 315a of the cooking chamber 315, thus, outside the latter.

The flavoring device 200 is provided in its working position inside the cooking chamber 315 of the cooking oven 100 inserting the heating element 305 and the sensor element 310 inside the casing 205 of the flavoring device 200 through the first coupling aperture 215 and the second coupling aperture 220, respectively.

For example, the flavoring device 200 is pushed towards the backwall 315a until an outer surface of the second sidewall 205b reaches the backwall 315a and the heating element 305 and the sensor element 310 are housed in the casing.

Preferably, the heating element 305 and the sensor element 310 may be provided protruding from a lower portion of the backwall 315a of the cooking chamber 315, preferably in proximity of a bottom wall 315b of the coking chamber 315.

In the example of FIG. 3A, the heating element 305 and the sensor element 310 are advantageously provided in the lower portion of the backwall 315a in such a way that the flavoring device 200 rests on the bottom wall 315b of the cooking chamber 315 (i.e., an outer surface of the bottom wall 205e of the casing 205 is in contact with the bottom wall 315b) when the flavoring device 200 houses the heating element 305 and the sensor element 310.

In this case, the flavoring device 200 may be advantageously slid along the bottom wall 315b of the cooking chamber 315 until the heating element 305 and the sensor element 310 are completely inserted inside the casing 205 of the flavoring device 200. Therefore the heating element 305 and the sensor element 310 results to be housed within the casing 205 of the flavoring device 200 when the latter is in an operating position inside the cooking chamber 315.

Advantageously, when the heating element 305 is completely inserted inside the casing 205 of the flavoring device 200, the heating element 305 is housed in the first compartment 235a in proximity of the smoking substance rack 255 when the latter is fitted in the first compartment 235a.

Preferably, but not necessarily, the heating element 305 is distant from the smoking substance rack 255 a distance comprised between 1/10 and 1/3 (o between 10%-33%) of the height of the second sidewall 205b.

Advantageously, when the sensor element 310 is completely inserted inside the casing 205 of the flavoring device 200, the sensor element 310 is housed in the second compartment 235b in proximity of the flavoring substance rack 240 when the latter is fitted in the second compartment 235b.

Preferably, but not necessarily, the sensor 310 is distant from the flavoring substance rack 240 a distance comprised between 0 and 1/5 (o between 0%-20%) of the height of the second sidewall 205b.

In the example of FIG. 3B, the cooking oven 100 advantageously comprises a receiving rack 320 for cooking plates (not shown) used for arranging food to be cooked within the cooking chamber 315.

Preferably, a lowermost portion of the receiving rack 320 comprises a rest slab 320a on which the flavoring device 200 may be positioned.

Moreover, the heating element 305 and the sensor element 310 are preferably provided protruding from a lower portion of the backwall 315a of the cooking chamber 315 having a position relative to the rest slab 320a of the receiving rack 320 adapted to allow the insertion of the heating element 305 and the sensor element 310 inside the casing 205 of the flavoring device 200 through the first coupling aperture 215 and the second coupling aperture 220 while the flavoring device 200 rests on the rest slab 320a of the receiving rack 320.

In this case, the flavoring device 200 may be advantageously slid along the rest slab 320a of the receiving rack 320 until the heating element 305 and the sensor element 310 are completely inserted inside the casing 205 of the flavoring device 200. Again, the heating element 305 and the sensor element 310 advantageously result to be housed within the casing 205 of the flavoring device 200 when the latter is in an operating position inside the cooking chamber 315.

In another advantageous embodiment of the invention (not shown), guides may be provided either on the bottom wall 315b of the cooking chamber 315 and/or on the rest slab 320a of the receiving rack 320 for facilitating the insertion of the heating element 305 and of the sensor element 310 inside the casing 205 of the flavoring device 200 by guiding a sliding of the latter towards the heating element 305 and the sensor element 310.

Figure 4A:
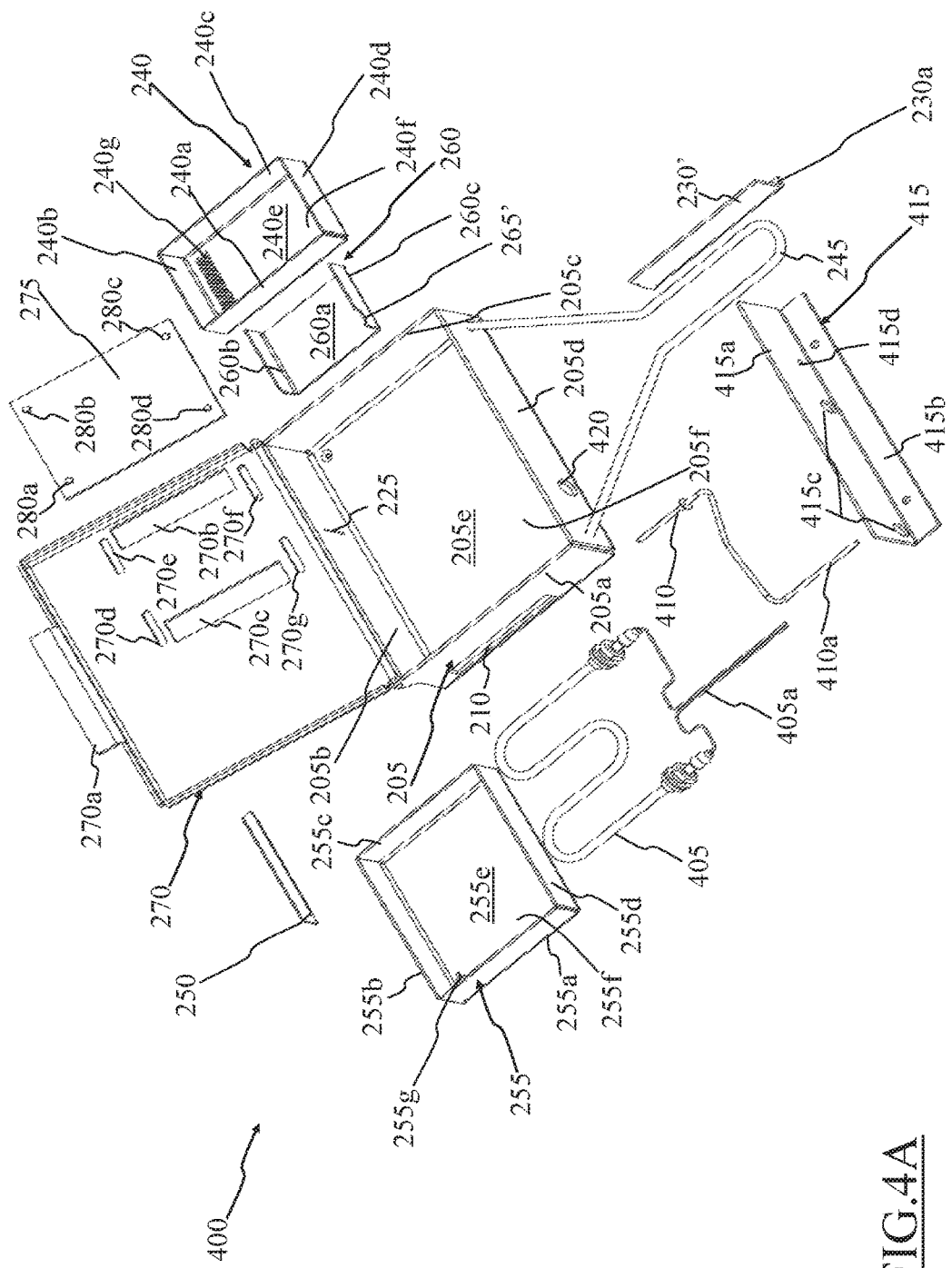
FIG. 4A is a perspective view of a flavoring device according to another advantageous embodiment of the present invention partly disassembled.
Figure 4B:
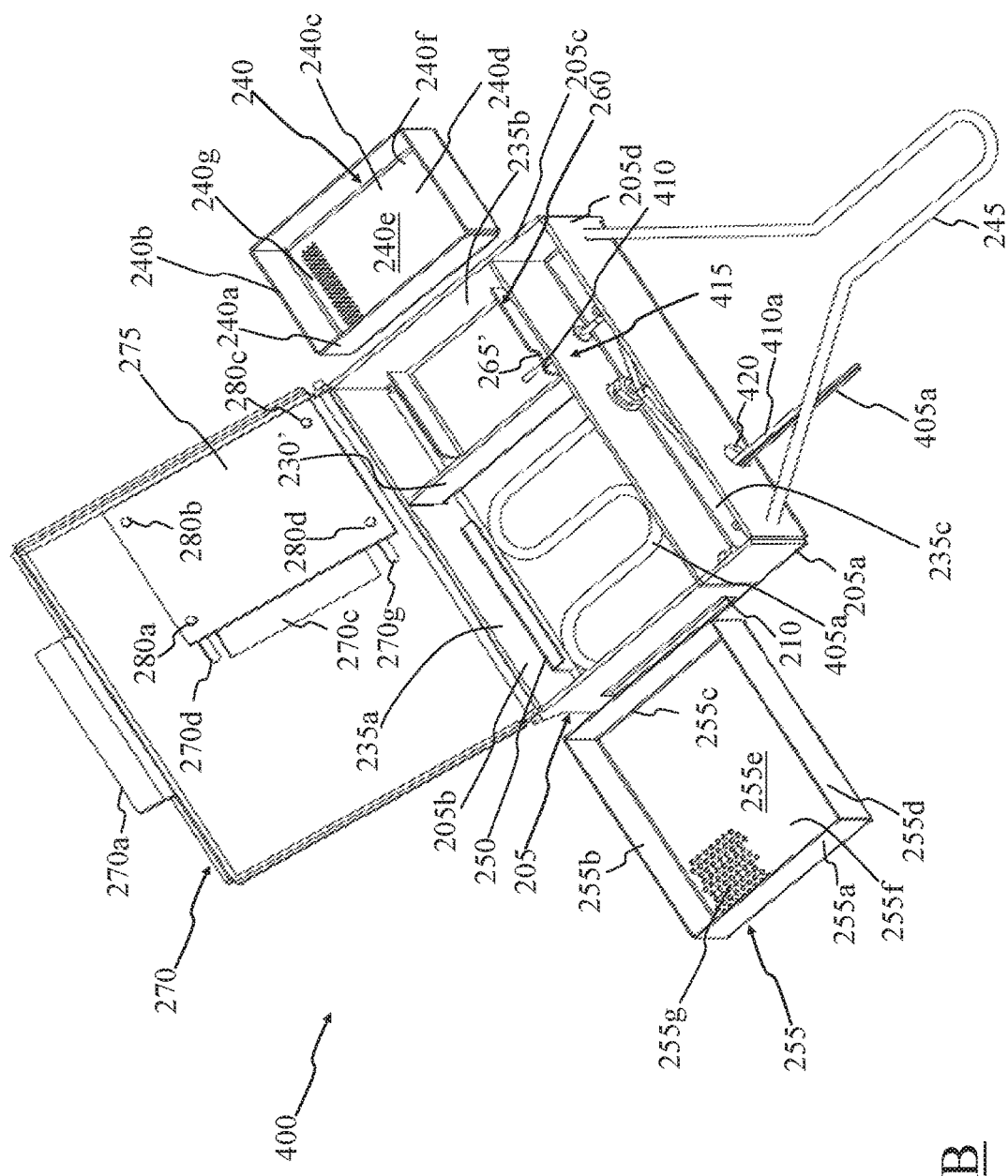
FIG. 4B is a perspective view of the flavoring device of FIG. 4A partly assembled.

Considering FIGS. 4A and 4B, they are perspective views of a flavoring device 400 according to another advantageous embodiment of the present invention.

The flavoring device 400 differs from the flavoring device 200 previously described in what follows (wherein similar elements are denoted by similar numeral references and their description is not repeated for the sake of conciseness).

The flavoring device 400 advantageously comprises a heating element 405 and a sensor element 410 housed within the casing 205.

To this purpose, the flavoring device 400 may advantageously comprise an additional separating element 415, in which case the separating element 230' is shorter than the separating element 230 provided in the flavoring device 200 described above. The separating element 230' and the additional separating element 415 separate the inside of the casing in three distinct separated compartments 235a-c.

In an advantageous embodiment of the invention, the additional separating element 415 preferably comprises two substantially rectangular shaped portions 415a and 415b. The two portions 415a and 415b are substantially perpendicularly coupled one with the other along one of their longer sides.

The additional separating element 415 has preferably a length equal to a distance between the first sidewall 205a and the third sidewall 205c of the four sidewalls 205a-d of the casing 205 (i.e., slightly smaller than a length of the second and fourth sidewall 205a and 205d). The height of the separating element 415 is preferably substantially equal to the height of the four sidewalls 205a-d of the casing 205 for completely separating the two separated compartments 235a and 235b from the third separated compartment 235c.

The first portion 415a of the additional separating element 415 is preferably coupled to the bottom wall 205e of the casing 205 in such a way that the second portion 415b of the additional separating element 415 protrudes from the bottom wall 205e towards the inside of the casing 205 transversal to the bottom wall 205e.

The second portion 415b of the additional separating element 415 preferably comprises a couple of first through holes 415c. A respective end of the heating element 405 is advantageously mounted to each one of first through holes 415c (e.g., by means of coupling elements such as washers and nuts coupled with the, preferably threaded, ends of the heating element 405).

The second portion 415b of the additional separating element 415 further preferably comprises a second through hole 415d. The sensor element 410 is mounted to the second through hole 415d (e.g., by means of coupling elements such as washers and nuts).

The first through holes 415c are advantageously provided on the second portion 415b of the additional separating element 415 in such a way that the heating element 405 is housed within the first compartment 235a of the inside of the casing 205 in proximity of the smoking substance rack 255 when the latter is fitted in the first compartment 235a. Preferably, but not necessarily, the heating element 405 is distant from the substance rack 255 a distance comprised between 1/10 and 1/3 (o between 10%-33%) of the height of the second sidewall 205b. Conversely, the second through hole 415d is advantageously provided on the second portion 415b of the additional separating element 415 in such a way that the sensor element is housed within the second portion 235b of the inside of the casing 205 in proximity of the flavoring substance rack 240 when the latter is fitted in the second compartment 235b. Preferably, but not necessarily, the sensor 410 is distant from the flavoring substance rack 240 a distance comprised between 0 and 1/5 (o between 0%-20%) of the height of the second sidewall 205b. Within the third separated compartment 235c of the inside of the casing 205, power wirings 405a are preferably disposed, operatively coupled with the ends of the heating element 405. Moreover, within the third separated compartment 235c of the inside of the casing 205, signal wirings 410a are preferably disposed, operatively coupled with the end of the sensor element 410.

In the flavoring device 400, the fourth sidewall 205d preferably comprises a wiring aperture 420 through which the power wirings 405a and the signal wirings 410a are passed through, advantageously in order to reach a control unit (not visible in FIGS. 4A and 4B, and numbered 505 in the FIGS. 5A and 5B) described in the following.

Preferably, the power wirings 405a and the signal wirings 410a are enclosed in a single sheath (not visible in FIGS. 4A and 4B, and numbered 510 in the FIGS. 5A and 5B), even more preferably the sheath 510 is made of a material resistant to the operating temperatures of the cooking oven (e.g., up to 300° C.).

Preferably, in the flavoring device 400, the second sidewall 205b of the casing 205 is not provided with the coupling apertures 215 and 220 provided in the flavoring device 200 previously described.

In the second support element 260 of the flavoring device 400, the niche 265' is provided on the flap 260c (instead that being provided on the flap 260b as in the second support element 260 of the flavoring device 200 previously described) for receiving the sensor element 410 protruding from the additional separating element 415.

In the flavoring device 400, the first support element 250 is preferably coupled with an inner surface of the second sidewall 205b opposite to the fourth sidewall 205d (i.e., opposite with respect to the disposition in the flavoring device 200) advantageously in such a way to form a cantilever structure protruding from the fourth sidewall 205d towards the inside of the casing 205 and above the air inlet opening 210 on the first sidewall 205a of the casing 205.

Figure 5A:
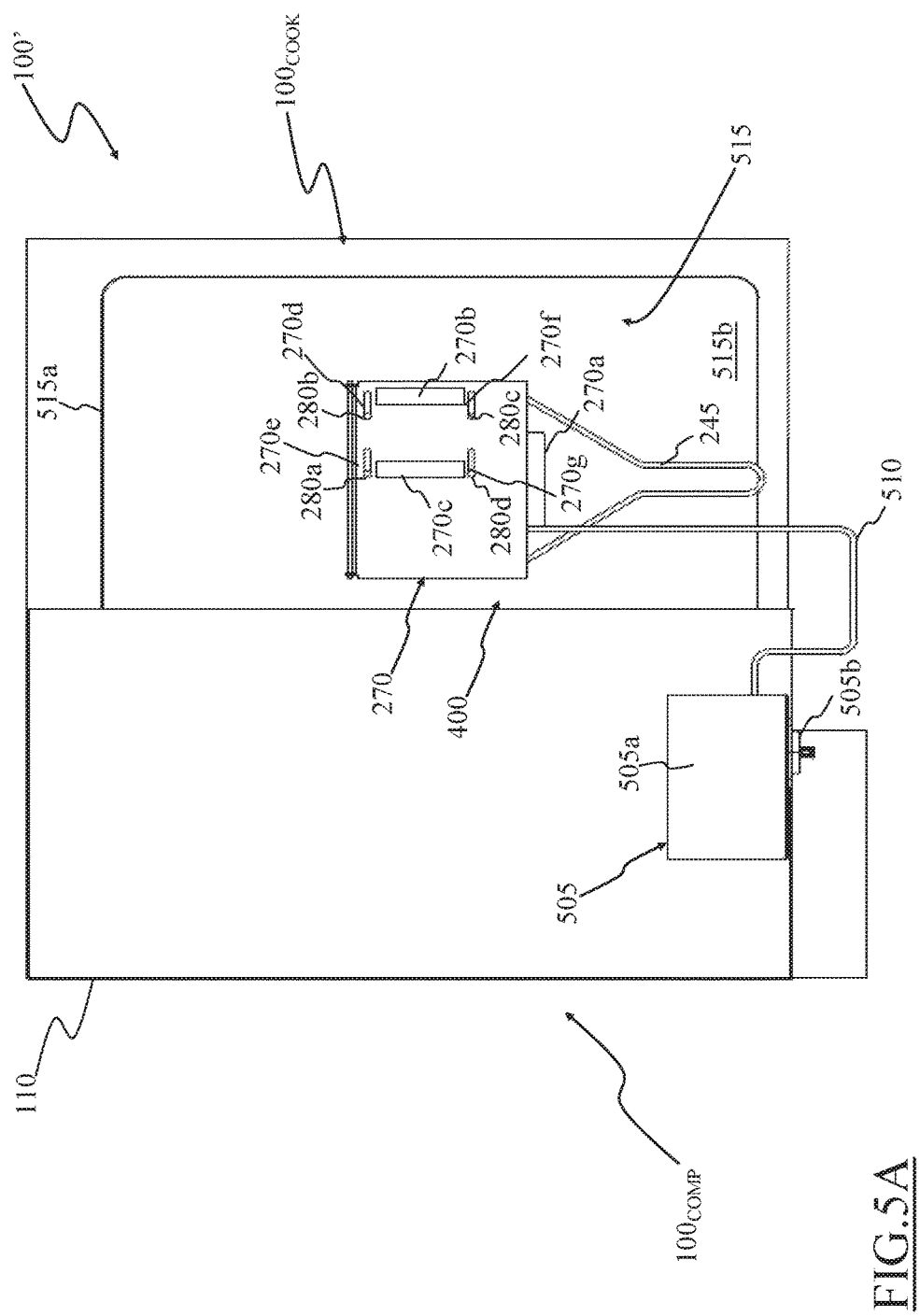
FIG. 5A is a schematic partly cross sectional top view of a cooking oven, shown without a door, housing the flavoring device of FIGS. 4A and 4B in a cooking chamber thereof.
Figure 5B:
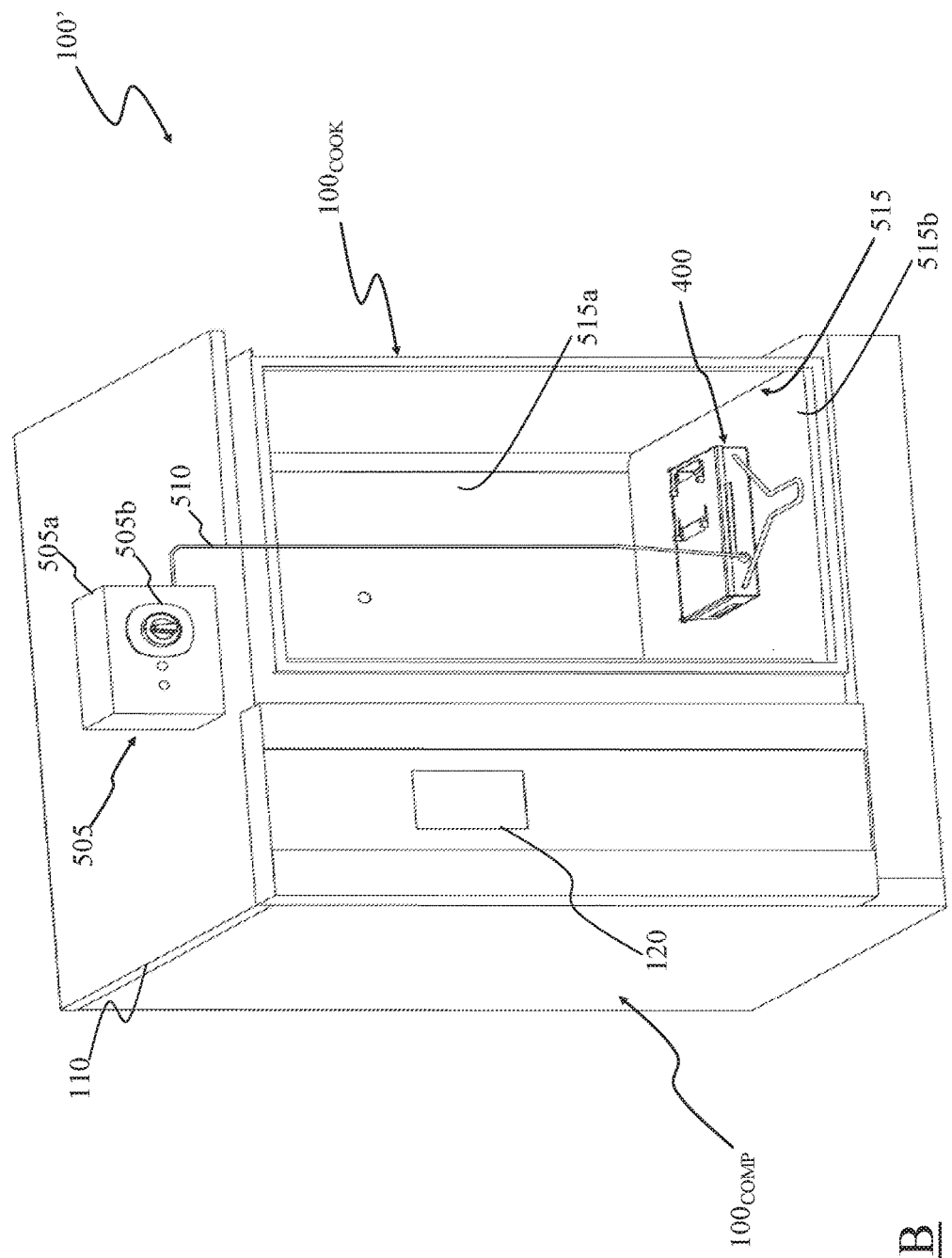
FIG. 5B is a perspective view of the cooking oven of FIG. 5A.

Turning to FIGS. 5A and 5B they are a schematic partly cross-sectional top view and a perspective view of a cooking oven 100' shown without the door 125 receiving the flavoring device 400 in the cooking chamber 515 thereof.

The cooking oven 100' differs from the cooking oven 100, previously described, only for not comprising the heating element 305 and the sensor element 310.

The flavoring device 400 is provided in the cooking chamber 515 of the cooking oven 100' for example resting on the bottom wall 515b of the cooking chamber 515, with the power wirings 405a and the signal wirings 410a preferably enclosed in the single sheath 510, and connected to the control unit 505 which may be positioned in the proximity or on the cooking oven 100', preferably outside the cooking chamber 515. In the example of FIGS. 5A and 5B, the control unit 505 is advantageously positioned on the top cover 110 of the cooking oven 100'.

The control unit 505 can advantageously comprise a casing 505a having a control interface 505b exposed on a surface of the casing 505b.

Preferably, the control unit 505 comprises an electric cord (not shown) that may be coupled to the power grid for receiving electric power supply.

The control interface 505b advantageously allows the user setting (e.g., by means of pushbuttons and/or a touch-screen) an operation of the flavoring device 400 (as described in the following).

Inside the casing 505a the control unit 505 advantageously comprises electric and electronics components adapted to selectively energizing the heating element 405, preferably according to temperature information obtained by means of the sensor element 410 (as described in the following) and the settings selected by the user through the control interface 505b.

It should be noted that, preferably, any position within the cooking chamber 515 of the cooking oven 100' may be considered an operating position for the flavoring device 400. For example, the flavoring device 400 may rest on any portion of the bottom wall 515b of the cooking chamber 515 or on a cooking plate or slab (not shown) inserted in a receiving rack (not shown) possibly provided in the cooking chamber 515.

During operation, the door 125 may be advantageously partially closed in order to avoid excessively compressing the power wirings 405a and the signal wirings 410a within the single sheath 510.

More advantageously, a sealing gasket (not shown) positioned along borders of the door 125 (in order to seal the cooking chamber 515 from the external environment) bends and compresses itself allowing the power wirings 405a and the signal wirings 410a within the single sheath 510 connecting the control unit 505 with flavoring device 400 even with the door 125 in a closing position completely closing the cooking chamber 515.

In another advantageous embodiment of the present invention (not shown), the power for energizing the heating element and/or the temperature information collected by the sensor element can be transmitted between the control arrangement and the flavoring device in a different manner other than wired. For example, the temperature information collected by the sensor element can be transmitted between the control arrangement and the flavoring device by means of radio frequency signals; in this case both the control arrangement and the flavoring device may advantageously comprise respective radio frequency transceiver elements adapted to perform such radio frequency signals transmission.

It should be noted that the flavoring device 400 with the control unit 505 are independent form the cooking oven 100'. Indeed, the flavoring device 400 with the control unit 505 are adapted to be used with substantially any type of existing cooking oven without requiring any modification to the latter.

Thanks to the heating element 305 or 405 housed spaced apart from the flavoring substance rack 240 and from the sensor element 310 or 410

Preferably, but not necessarily, the heating element 305 or 405 is distant from the flavoring substance rack 240 and/or from the sensor element 310 or 410 a distance comprised between 1/10 and 1/2 (o between 10%-50%) of the length of the second sidewall 205b.

The flavoring device 200 and the flavoring device 400 according to the present invention allow efficiently volatilizing or vaporizing flavoring molecules of the flavoring substances contained in the flavoring substance rack 240 by heating the flavoring substances through a controlled air convection, thus avoiding destroying the flavoring molecules by exposure to an excessive heat.

Moreover, if smoking substance rack 255 is advantageously provided in flavoring device 200 and flavoring device 400 according to the present invention, the possibility to control heating element 305 and 405, possibly in relation to the temperature information collected respectively by sensors 310 and 410, also allow generating and diffusing smoking molecules of the smoking substances contained in the smoking substance rack 255 substantially by heating the smoking substances through controlled radiation and convection of heat, thus providing a correct intensity of heat avoiding conferring an unpleasant burnt taste to a food being smoked.

In other advantageous embodiments of the present invention (not shown), the smoking substance rack 255 may be omitted, therefore, also the first support element 250, the smoking air outlet opening 270c, the sliding slots 270d-e and the shutter element 275 may be omitted as well.

In a further advantageous embodiment, not illustrated in attached Figures, the flavoring device 400 can be associated to an oven externally to the cooking chamber; in this case a suitable conduit or pipe should be advantageously provided, fluidly connected at one side to the flavoring outlet opening(s) and/or smoking air outlet opening(s) of the flavoring device, and fluidly connected, at the other side, to the internal of the cooking chamber, so as to allow taking the flavored or smoked air coming from the flavoring device into the cooking chamber. In this advantageous embodiment a fan can be advantageously provided, for enhancing the air flow from the flavoring device to the cooking chamber.

Figure 6A:
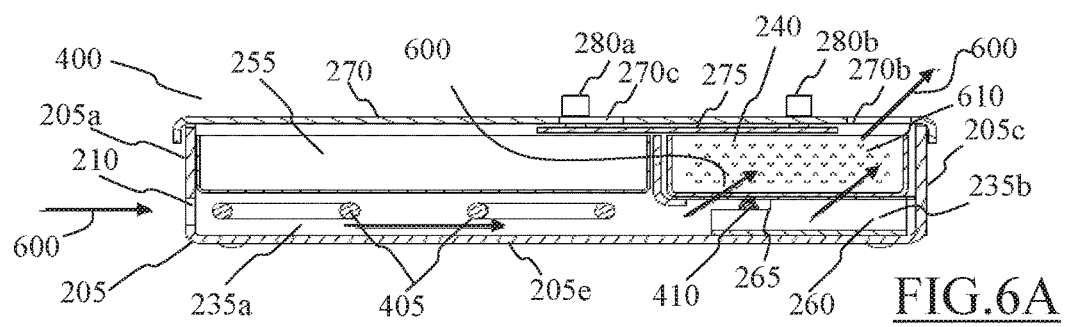
FIGS. 6A and 6B are cross-sectional and top views, respectively, showing a flavoring air path for air crossing the flavoring device according to an embodiment of the present invention.
Figure 6B:
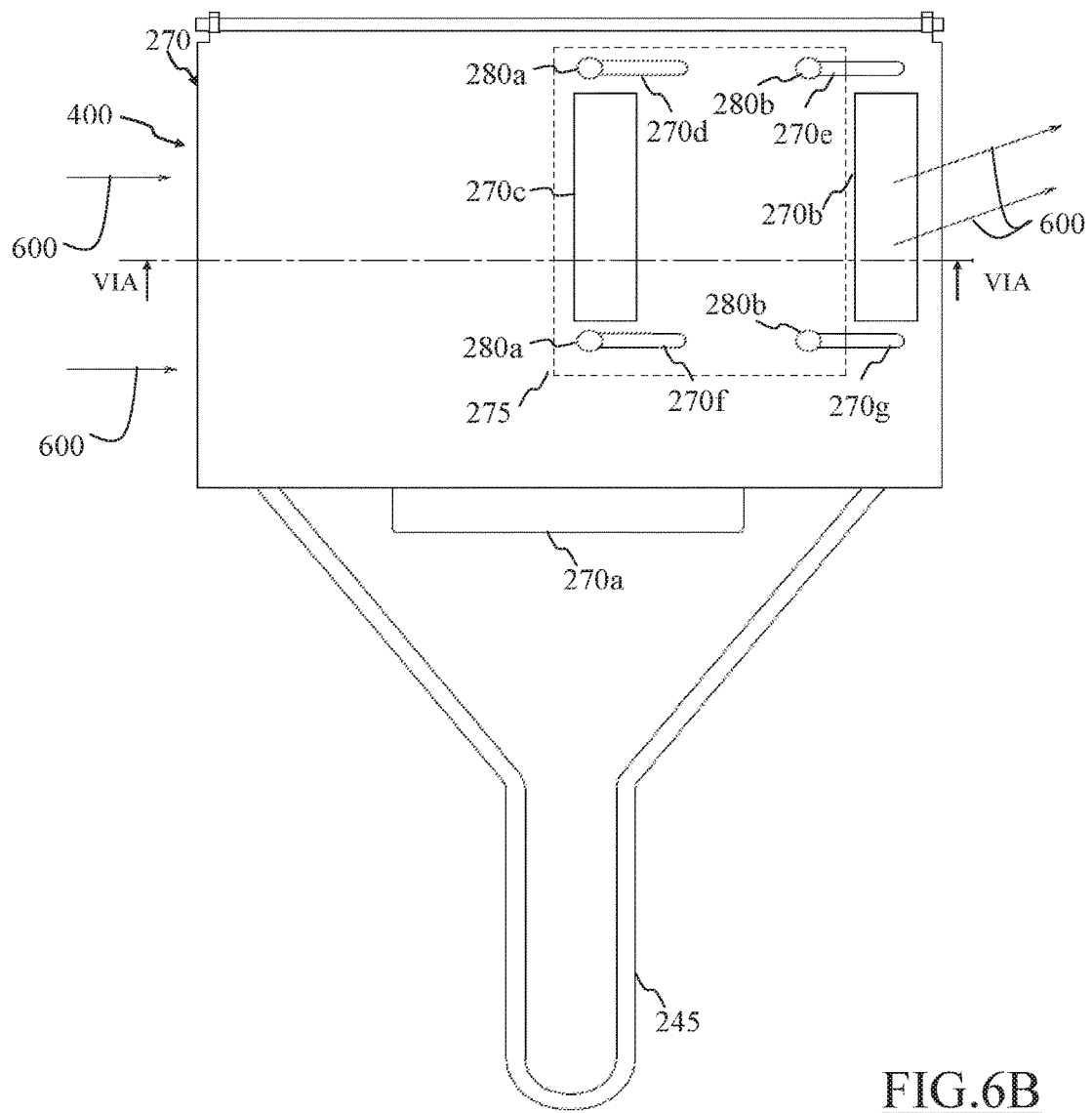

By making reference to FIGS. 6A and 6B, which are cross-sectional and top views, respectively, of the flavoring device 400, a first air path, alternatively called also flavoring air path in the following, indicated in FIGS. 6A and 6B with arrows 600 for air crossing the flavoring device during a flavoring process is described.

During the flavoring process, the shutter element 275 is advantageously positioned in such a way to close the smoking air outlet opening 270c, while the flavoring air outlet opening 270b of the lid 270 is accessible; therefore the flavoring air path is formed between the air inlet opening 210 and the flavoring outlet opening 270b.

The flavoring substance rack 240 is least partially disposed along the flavoring air path, so that flavoring substance(s) 610 contained in the flavoring substance rack 240 can be crossed (and heated) by the air flux heated by heating element 405.

During the flavoring process, according to convection principles, the air travels along the flavoring air path 600 in the following manner.

Air entering the first portion 235a of the casing 205 from the air inlet opening 210 is heated by the energized heating element 405. The (turbulent) heated air moves from the hotter first portion 235a to the colder second portion 235b (the first portion 235a is hotter than the second portion 235b since the first portion 235a houses the energized heating element 405) where the heated air crosses the through holes 240g in the bottom wall 240e of the flavoring substance rack 240 in order to reach the flavoring air outlet opening 270b on the lid 270 and then spreading in the cooking chamber 515 therefrom.

The heated air crossing the through holes 240g reaches the flavoring substance(s) 610 provided in the flavoring substance rack 240 and heats it up, thereby volatilizing flavoring molecules comprised in the flavoring substance(s) 610. The flavoring molecules are then carried by the heated air away from the flavoring substance rack 240 and from the flavoring device 400 through the flavoring air outlet opening 270b, thus diffusing in the cooking chamber 515, flavoring any food disposed in the cooking chamber 515 surrounding the flavoring device 400.

Figure 7A:
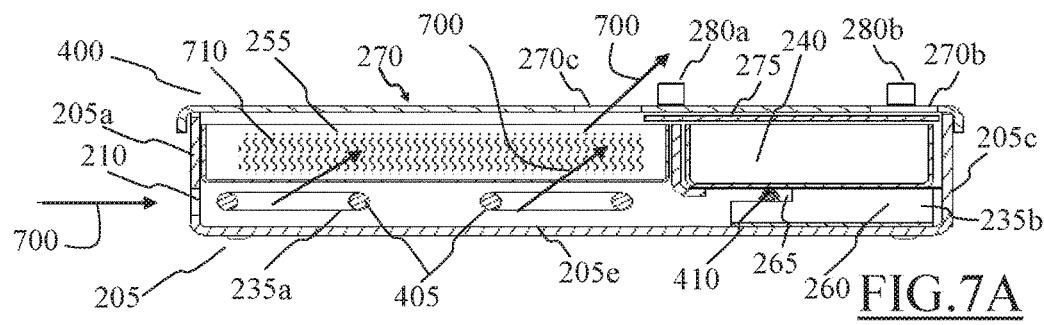
FIGS. 7A and 7B are cross-sectional and top views, respectively, showing a smoking air path for air crossing the flavoring device according to an embodiment of the present invention.
Figure 7B:
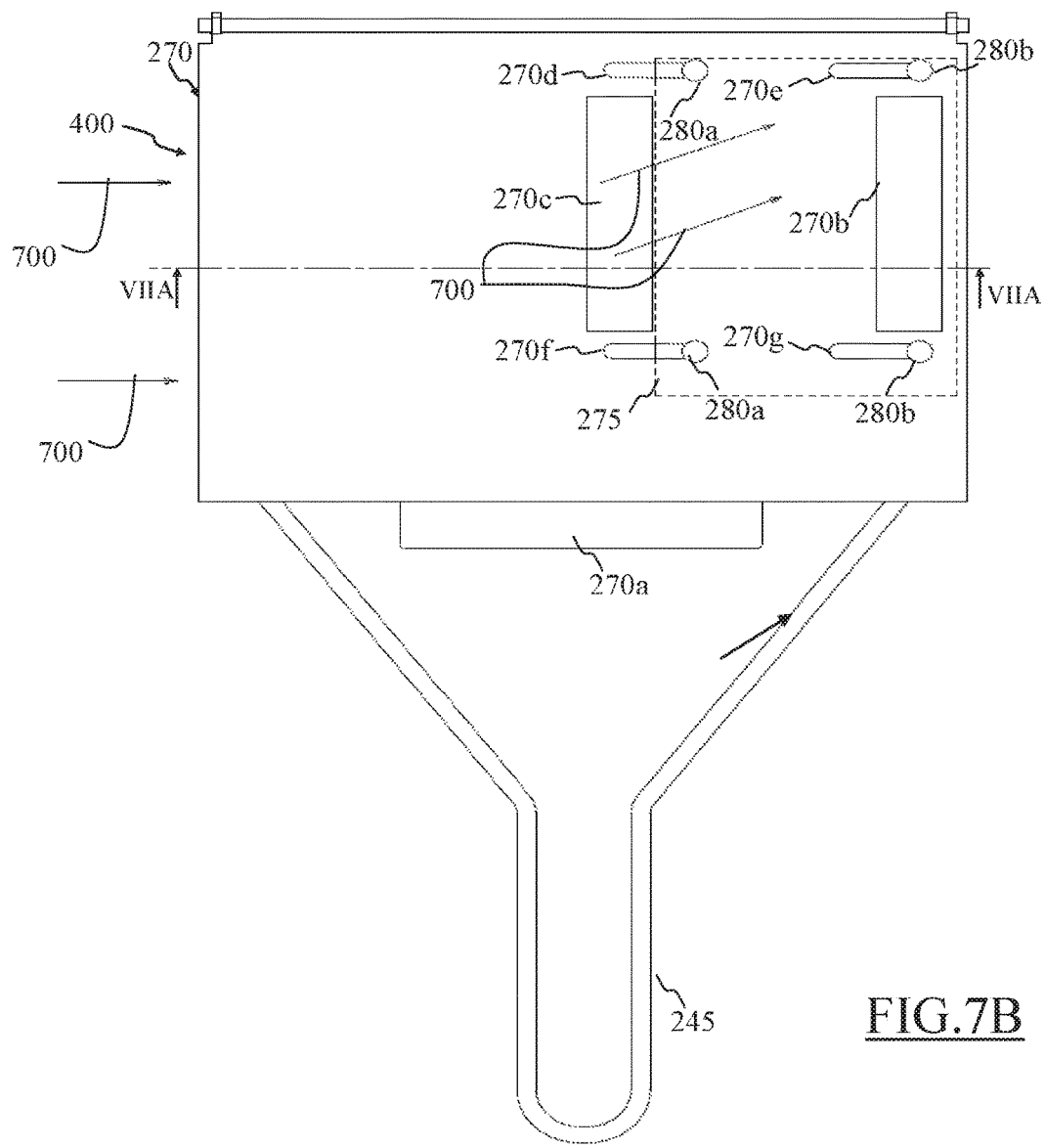

With reference to FIGS. 7A and 7B, which are cross-sectional and top views, respectively, of the flavoring device 400, a second air path, alternatively called also smoking air path in the following, indicated in FIGS. 7A and 7B with arrows 700 for air crossing the flavoring device during a smoking process is described.

It should be noted that the following description may be applied to the flavoring device 200 as well.

During the smoking process, the shutter element 275 is positioned in such a way to close the flavoring air outlet opening 270b, while the smoking air outlet opening 270c of the lid 270 in its closing position is accessible, therefore the smoking air path 700 is formed between the air inlet opening 210 and the smoking outlet opening 270c Along the smoking air path 700 is at least partially disposed the smoking substance rack 255, in which a smoking substance(s) 710 is disposed.

During the smoking process, according to convection principles, the air travels along the smoking air path 700 in the following manner.

Air entering the first portion 235a of the casing 205 from the air inlet opening 210 is heated by the energized heating element 405. The (turbulent) heated air moves from the hotter surroundings of the heating element 405 in the lower part of the first portion 235a, to the smoking air outlet opening 270c on the lid 270 in the colder surroundings of the upper part of the first portion 235a (the lower part of the first portion 235a is hotter than the upper part of the first portion 235a since the lower part of the first portion 235a houses the energized heating element 405) and then spreading in the cooking chamber 515 therefrom.

Moreover, thanks to the proximity between the heating element 405 and the smoking substance rack 255 the smoking substance 710 receives heat directly radiated from the heating element 405.

Therefore, the energized heating element 405 transmits heat mainly by convection (i.e., through the heated air in the second air path 700) and by radiation (since the heating element 405 is provided in the proximity of the smoking substance rack 255) to the smoking substance rack 255.

Advantageously, the smoking substance(s) 710 contained in the smoking substance rack 255 are heated up and charred, thus releasing smoke.

The heated air crossing the through holes 255g facilitates the release of the smoke generated from the smoking substance through the smoking air outlet opening 270c on the lid 270. The smoke generated from the smoking substance diffuses in the cooking chamber 515, smoking any food disposed in the cooking chamber 515 surrounding the flavoring device 400.

Figure 8:
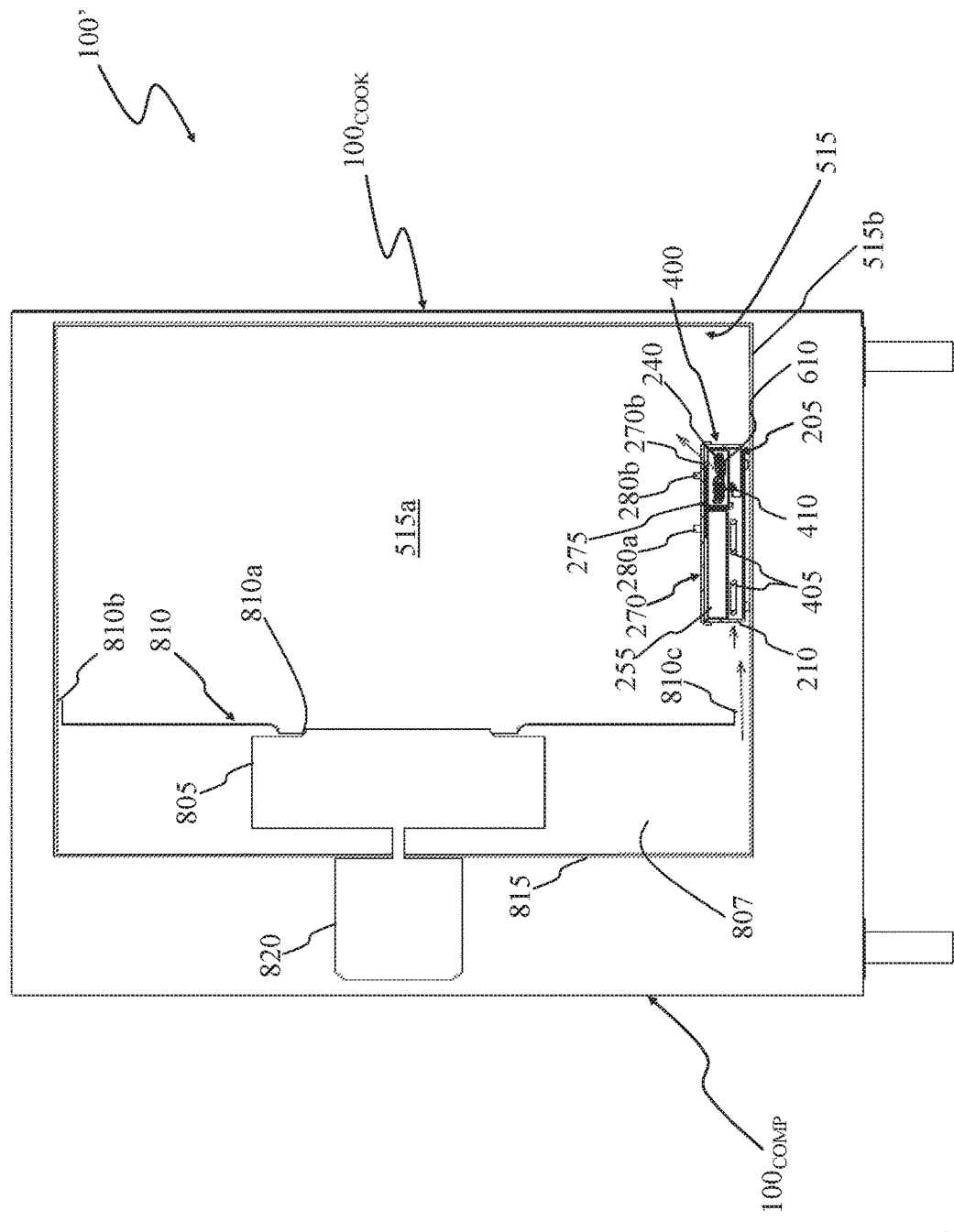
FIG. 8 is a front cross-sectional view of the cooking oven with the flavoring device inside the cooking chamber thereof.

The airflow flowing through the flavoring air path 600 and the smoking air path 700 may be enhanced by a fan 805 provided in the cooking oven 100' as shown in FIG. 8, which is a front cross-sectional view of the cooking oven 100' with the flavoring device 400 inside the cooking chamber 515 thereof, with the fan 805 of the cooking oven 515 providing a forced airflow through the flavoring device 400.

It should be noted that, although in the following reference is made only to the flavoring air path 600 of the flavoring device 400 in the cooking oven 100', same considerations apply for the smoking air path 700 thereof and for the flavoring air path 600 and the smoking air path 700 of the flavoring device 200 in the cooking oven 100.

The cooking oven 100' can advantageously comprise a fan, for example a radial fan 805, provided preferably in a cavity 807 between a sidewall 810 of the cooking chamber 515 and a component portion wall 815. The fan 805 is advantageously operatively coupled with a fan motor 820, preferably provided in the component portion $100_{COMP}$ of the cooking oven 100'.

The radial fan 805 is advantageously exposed on a sidewall 810 of the cooking chamber 515 of the cooking oven 100'. Preferably, the radial fan 805 is exposed at a fan opening 810a of the sidewall 810 of the cooking chamber 515. Preferably, the fan opening 810a is provided at a central position of the sidewall 810.

The sidewall 810 of the cooking chamber 515 advantageously comprises at least top and bottom air passages 810b and 810c provided in proximity of a top wall 815 of the cooking chamber 515 and in proximity of the bottom wall 515e of the cooking chamber 515, respectively.

During the operation of the radial fan 805 (i.e., when the radial fan 805 is rotated by the fan motor 820) air is sucked from the cooking chamber 515 trough the fan opening 810a on the sidewall 810 and blown into the cavity 807 for re-entering the cooking chamber 515 of the cooking oven 100' through (at least) the top and bottom air passages 810b and 810c.

By providing the flavoring device 400 with the air inlet opening 210 facing the bottom air passage 810c, the forced flow of air (i.e., forced by the fan 805) re-entering the cooking chamber 515 of the cooking oven 100' directly hits the outer surface of the first sidewall 205a of the flavoring device 400.

Therefore, part of such forced flow of air is injected into the casing 205 producing an enhanced airflow that crosses the flavoring air path 600 previously described. Thanks to the forced flow of air crossing the flavoring air path 600 it is possible to speed up a flavoring process and the flavoring molecules are diffused more evenly within the whole cooking chamber 515. It should be noted that the same consideration applies to air flowing in the smoking air path 700 in case of a smoking process.

Naturally, in order to satisfy local and specific requirements, a person skilled in the art may apply to the solution described above many logical and/or physical modifications and alterations. More specifically, although this solution has been described with a certain degree of particularity with reference to two embodiments thereof, it should be understood that various omissions, substitutions and changes in the form and details as well as other embodiments are possible.

For example, in an advantageous embodiment of the present inventions (not shown) the air inlet opening and outlet openings may have a different shape such as circular shaped. Moreover, the air inlet opening and the air outlet openings may comprise a plurality of through holes (of any shape).

In other advantageous embodiments of the present invention (not shown), the air paths inside the casing may have a different design.

For example, in another advantageous embodiment of the present invention, the flavoring device comprises two independent air path each fluidly connecting a respective air inlet opening to a respective air outlet opening.

In another advantageous embodiment of the present invention (not shown), the flavoring device comprises a pair of air inlet openings, i.e. one associated with the flavoring air path and the other associated with the smoking air path, and a single outlet opening. Advantageously, a shutter element may be advantageously provided in correspondence of the pair of air inlet openings in order to selectively opening/closing one thereof.

In a further advantageous embodiment of the present invention, the flavoring device comprises a single inlet air opening and a single outlet opening. Advantageously, a flap element may be provided in the casing in order to route air in a flavoring air path (along which the flavoring substance rack is provided) or in a smoking air path (along which the smoking substance rack is provided) formed within the casing of the flavoring device.

In yet other advantageous embodiments of the present invention, a single air path may be provided in the casing of the flavoring device. It should be noted that such yet other advantageous embodiments allows performing both a flavoring process and a smoking process as well. For example, one selected between the flavoring substance rack and the smoking substance rack is preferably positioned along the single air path in order to perform the corresponding flavoring process or smoking process, respectively.

Moreover, in a yet further advantageous embodiment of the present invention (not shown) the flavoring device is adapted to be operated in a combined smoking and flavoring process. To this purpose, the flavoring device can advantageously comprise a shutter element adapted to selectively allow the passage of air through both the flavoring air outlet opening and the smoking air outlet opening in addition to selectively close one between the flavoring air outlet opening and the smoking air outlet opening (as described above). Alternatively, in yet another advantageous embodiment the shutter element may be omitted, or the lid may be removed, and the flavoring device may be used only to perform to combined smoking and flavoring processes (with the aperture of the casing that acts as air outlet opening).

Figure 9:
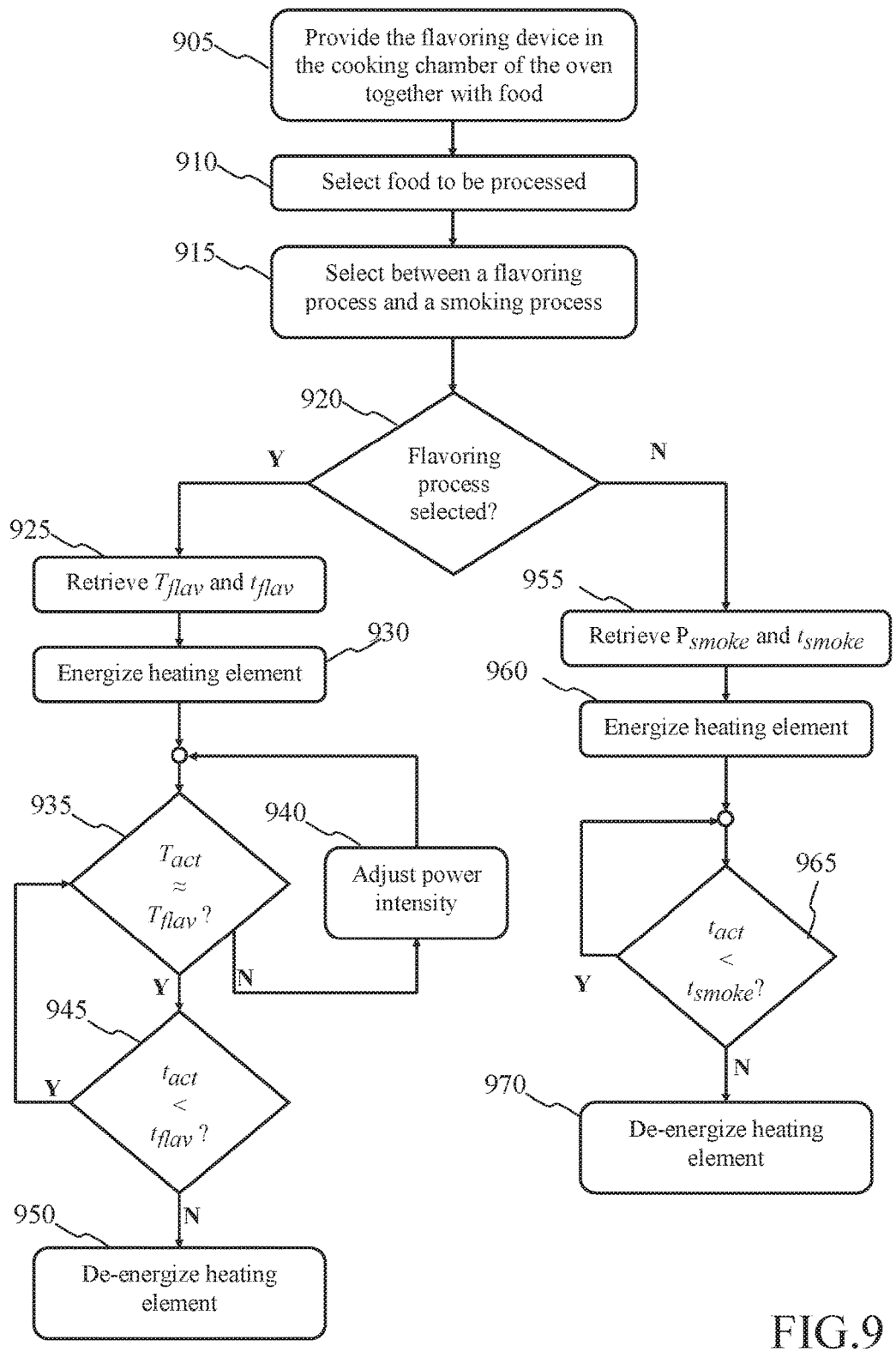
FIG. 9 is a schematic flowchart of a method of operating the flavoring device according to an advantageous embodiment of the present invention.

Having described the flavoring device according to embodiments of the present invention it will be now described a method of operating the flavoring device 400 by means of FIG. 9, which is a schematic flowchart of a method of operating the flavoring device 400 according to an advantageous embodiment of the present invention.

It should be noted that, although the following method is described by making reference to the flavoring device 400 and to the control unit 505, the flavoring control herein described may be used exactly in the same way for controlling the operation of the flavoring device 200 and the control arrangement of the cooking oven 100 as well.

Initially (block 905), the flavoring device 400 is positioned inside the cooking chamber 515 of the cooking oven 100' together with the food to be processed, which is not illustrated.

If the flavoring process is going to be performed, the shutter element 275 is positioned in such a way to close the smoking air outlet opening 270c, while the flavoring air outlet opening 270b is accessible (i.e., the smoking air path 700 is blocked while the flavoring air path 600 is opened). A selected flavoring substance(s) 610 is(are) provided in the flavoring substance rack 240 fitted in the second compartment 235b of the casing 205 and the lid 270 is positioned in its closed position. Optionally, the smoking substance rack 255 may be removed from the casing 205 (or it can be not provided at all in the casing 205). Advantageously the flavoring substance(s) 610 can be provided in the flavoring substance rack 240 before or after the positioning of the flavoring device 400 into the cooking chamber 515.

Conversely, if a smoking process is to be performed, the shutter element 275 is positioned in such a way to close the flavoring air outlet opening 270b, while the smoking air outlet opening 270c is accessible (i.e., the flavoring air path 600 is blocked while the smoking air path 700 is opened). A selected smoking substance(s), not illustrated, is(are) provided in the smoking substance rack 255 fitted in the first compartment 235a of the casing 205, and the lid 270 is positioned in its closed position. Optionally, the flavoring substance rack 240 may be removed from the casing 205 (or it can be not provided at all in the casing 205). Advantageously the smoking substance(s) 710 can be provided in the smoking substance rack 255 before or after the positioning of the flavoring device 400 into the cooking chamber 515.

Optionally (block 910), the user interface 505b of the control unit 505 can advantageously be operated for selecting a type (e.g., meat, fish, poultry, vegetables, cheese, etc.) and, possibly, an amount of food to be processed (i.e., flavored or smoked).

Then (block 915), the user interface 505b of the control unit 505 is operated for selecting a flavoring process or a smoking process according to which between the selected flavoring substance and the selected smoking substance has been provided in the flavoring substance rack 240 or in the smoking substance rack 255, respectively.

In addition to advantageously selecting between a flavoring process and a smoking process, it may be also advantageously specified (through the user interface 505b) the selected flavoring substance or the selected smoking substance housed in the flavoring substance rack 240 or in the smoking substance rack 255, respectively. To this purpose, the user interface 505b may provide a list of selectable flavoring substances and smoking substances to the user.

In addition (e.g., if it is used a non-listed flavoring or smoking substance) or alternatively, the user may be preferably allowed to directly indicate through the user interface a custom flavoring temperature and a custom flavoring time, or a custom smoking power and a custom smoking time to be used in an automated flavoring process or in an automated smoking process, respectively, described below.

Afterwards, an automated procedure is performed by the control unit 505 according to the indication provided through the user interface 505b of the control unit 505 (at previous blocks 910 and 915).

According to whether the flavoring process or the smoking process has been selected, the automated procedure proceeds with the automated flavoring process or the automated smoking process (decision block 920).

In the case the flavoring process has been selected (exit branch Y of decision block 920) the control unit 505 retrieves (block 925) from a memory element (not shown; e.g., a ROM-type memory or a Look-Up Table) of the control unit 505 a flavoring temperature $T_{flav}$ and a flavoring time $t_{flav}$ (or the custom flavoring temperature and the custom flavoring time previously indicated by the user) associated with the selected flavoring substance (defined at block 915) and possibly associated with the type of food to be processed (defined at optional block 910).

The memory element of the control unit 505 advantageously comprises a plurality of flavoring temperatures $T_{flav}$ or range of flavoring temperatures [$T_{flavmin}$, $T_{flavmax}$] and a flavoring times $t_{flav}$ associated to respective selected flavoring substance (defined at block 915) and possibly associated to the type of food to be processed (defined at optional block 910).

In fact, each flavoring substance used for flavoring the food has a preferred specific volatilization/vaporization temperature or range of volatilization/vaporization temperatures that should be fulfilled in order to not alter the flavoring molecules and to prevent the formation of harmful substances. An example of flavoring temperatures $T_{flav}$ for different flavoring substance is shown in the following Table 1:

TABLE 1

| Flavoring Substance | $T_{flav}$ (° C.) |
| --- | --- |
| Thyme | 190 |
| Lavender | 130 |

TABLE 1-continued

| Flavoring Substance | $T_{flav}$ (° C.) |
|---|---|
| Sage | 190 |
| Lemon Balm | 140 |
| Garlic | 160 |
| Ginger | 150 |
| Cloves | 190 |
| Cinnamon | 180 |

The flavoring times $t_{flav}$ associated with respective selected flavoring substance (defined at block 915) and possibly associated with the type of food to be processed (defined at optional block 910) are times deemed sufficient to perform a satisfactory flavoring of the food within the cooking chamber 515.

Then, the control unit 505 energizes (block 930) the heating element 405 in order to heat the air inside the casing 205 of the flavoring device 400, as previously described.

The control unit 505 monitors (e.g., periodically or continuously) the temperature information provided by the sensor element 410 checking (block 935) whether an actual temperature $T_{act}$ (comprised in, or attainable from, the temperature information provided by the sensor element 410) of the air inside the casing 205 (in the proximity of the flavoring substance rack 240) is substantially equal to the flavoring temperature $T_{flav}$ or falls within the range of flavoring temperatures [$T_{flavmin}$, $T_{flavmax}$] associated with the selected flavoring substance.

In the negative case (exit branch N of decision block 935), i.e. the actual temperature $T_{act}$ substantially differs from the flavoring temperature $T_{flav}$, or is not within the range of flavoring temperatures [$T_{flavmin}$, $T_{flavmax}$], the control unit 505 adjusts (block 940) the electric power provided to the heating element 405 in order to obtain an actual temperature $T_{act}$ substantially equal to the flavoring temperature $T_{flav}$ (i.e., $T_{act} \approx T_{flav}$) or within the range of flavoring temperatures [$T_{flavmin}$, $T_{flavmax}$] (i.e., $T_{flavmin} \leq T_{act} \leq T_{flavmax}$), and operation returns to block 935. For example, the control unit 505 increases or decreases (or interrupts) the electric power energizing the heating element 405 according to whether the actual temperature $T_{act}$ is lower than the flavoring temperature $T_{flav}$ or the actual temperature $T_{act}$ is higher than the flavoring temperature $T_{flav}$, respectively.

It should be noted that the control unit 505 implements a refined temperature control on the actual temperature $T_{act}$ of air provided to the flavoring substance rack 240 by controlling the energizing of the heating element 405 and the feedback provided by sensor element 410 (in other words the steps performed at block 935 and block 940 provide a feedback loop for controlling the actual temperature $T_{act}$).

Such a refined temperature control is improved by the position of the sensor element 410 at the flavoring substance rack 240 and spaced apart from the heating element 405, so that the sensor element 410 is able to provide a precise and reliable temperature information, related to the actual temperature $T_{act}$ of air at the flavoring substance rack 240 which is heating the flavoring substance within the latter, to the control unit 505.

Indeed, the position of the sensor element 410 confers to the temperature control a relatively high sensitivity to any temperature variations localized in the proximity of the flavoring substance rack 240, such as for example temperature variations due to variations in the airflow of air traveling in the flavoring air path 600.

Therefore, the temperature control implemented by the control unit 505 ensures that the actual temperature $T_{act}$ is substantially equal to the desired flavoring temperature $T_{flav}$ or within the desired range of flavoring temperatures [$T_{flavmin}$, $T_{flavmax}$] during the whole flavoring process. Accordingly, the volatilizing of the flavoring molecules from the flavoring substance is substantially uniformly at the flavoring temperature $T_{flav}$ or within the range of flavoring temperatures [$T_{flavmin}$, $T_{flavmax}$] during the flavoring process, providing an improved flavoring of the food in the cooking chamber 515 of the cooking oven 100'.

Advantageously, this leads to an enhanced flavoring of food processes, since the flavoring molecules comprised in the flavoring substance are not altered by an excessively high or instable actual temperature $T_{act}$. For example, the reaching of a combustion temperature of the flavoring substance (that causes the destruction of the majority of the flavoring molecules) may be utterly avoided.

If the actual temperature $T_{act}$ is substantially equal to the flavoring temperature $T_{flav}$ (exit branch Y of decision block 935), or within the range of flavoring temperatures [$T_{flavmin}$, $T_{flavmax}$], the electric power energizing the heating element 405 is kept substantially constant, and the control arrangement 505 checks (decision block 945) whether an actual time $t_{act}$, for example provided by a clock element or timer (not shown) comprised in the control unit 505, is lower than the flavoring time $t_{flav}$ associated with the selected flavoring substance (i.e., $t_{act} < t_{flav}$)

In the affirmative case (exit branch Y of decision block 945), i.e. the actual time $t_{act}$ is lower than the flavoring time $t_{flav}$, the flavoring process is not yet completed and the operation returns at block 935.

In the negative case (exit branch N of decision block 945), i.e. the actual time $t_{act}$ is equal to, or greater, than the flavoring time $t_{flav}$, the flavoring process is considered completed and the control unit 505 de-energizes (block 950) the heating element 415.

Back at block 920, in the case the smoking process has been selected (exit branch N of decision block 920) the control unit 505 retrieves (block 955) from the memory element (not shown) of the control unit 505 a smoking power $P_{smoke}$ and a smoking time $t_{smoke}$ (or the custom smoking power and the custom smoking time previously indicated by the user) associated with the selected smoking substance 710 (defined at block 915) and possibly associated with the type of food to be processed (defined at optional block 910).

The memory element of the control unit 505 can advantageously comprise a plurality of smoking powers $P_{smoke}$ and a smoking times $t_{smoke}$ associated with respective selected smoking substance 710 (defined at block 915) and possibly associated with the type of food to be processed (defined at optional block 910).

In fact, each smoking substance used for smoking the food has a specific smoking temperature that may be reached and maintained by energizing the heating element 405 with a predefined smoking power $P_{smoke}$ that must not be exceeded in order to not excessively burn the associated smoking substance, thus preventing the formation of harmful substances.

In an embodiment of the present invention, the smoking powers $P_{smoke}$ are indicated as a percentage of a maximum power $P_{max}$ with which the heating element 405 may be energized.

For example, the smoking powers $P_{smoke}$ associated with each respective selected smoking substance 710 may be provided to the heating element 405 by adjusting an intensity of an electric current crossing the heating element 405 or, alternatively, by adjusting a duty cycle of the electric current crossing the heating element 405.

The smoking times $t_{smoke}$ associated with respective selected smoking substance (defined at block 915) and possibly associated with the type of food to be processed (defined at optional block 910) are times deemed sufficient to perform a satisfactory smoking of the food within the cooking chamber 515.

Then, the control unit 505 energizes (block 960) the heating element 405 at the smoking power $P_{smoke}$ associated with the selected smoking substance (defined at block 915) in order to heat the smoking substance contained in the smoking substance rack 255 housed in the casing 205 of the flavoring device 400 as previously described.

The control unit 505 checks (e.g., periodically or continuously; decision block 945) whether the actual time $t_{act}$ is lower than the smoking time $t_{smoke}$ associated with the selected flavoring substance (i.e., $t_{act} < t_{smoke}$).

In the affirmative case (exit branch Y of decision block 965), i.e. the actual time $t_{act}$ is lower than the flavoring time $t_{smoke}$, the smoking process is not yet completed and the operation remains at block 965.

In the negative case (exit branch N of decision block 965), i.e. the actual time $t_{act}$ is equal to, or greater, than the smoking time $t_{smoke}$, the smoking process is considered completed and the control unit 505 de-energizes (block 970) the heating element 415.

It should be noted that the method described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

For example, an alternative advantageous embodiment of the present invention, the user may preferably select a smoking temperature rather than a smoking power for the smoking process to be performed and the control unit or the control arrangement advantageously uses a smoking power associated with the selected smoking temperature.

In a yet alternative advantageous embodiment of the present invention, the smoking process may be controlled trough the (indirect, since the sensor element is spaced apart from the heating element) temperature information provided by the sensor element. Similarly, in a different embodiment of the present invention an additional sensor element may be provided in proximity of the smoking substance rack in order to provide additional temperature information referred associated with a temperature of the smoking substance. In both cases, the user may preferably select a smoking temperature rather than a smoking power for the smoking process to be performed and the control of the smoking process is performed in a manner similar to the control of the flavoring process described above.

Turning now to FIGS. 10A-10G, they are various views of a flavoring device 1000 according to an alternative embodiment of the present invention.

The flavoring device 1000 differs from the flavoring devices 200 and 400 previously described in what follows (wherein similar elements are denoted by similar numeral references and their description is not repeated for the sake of conciseness).

Figure 11A:
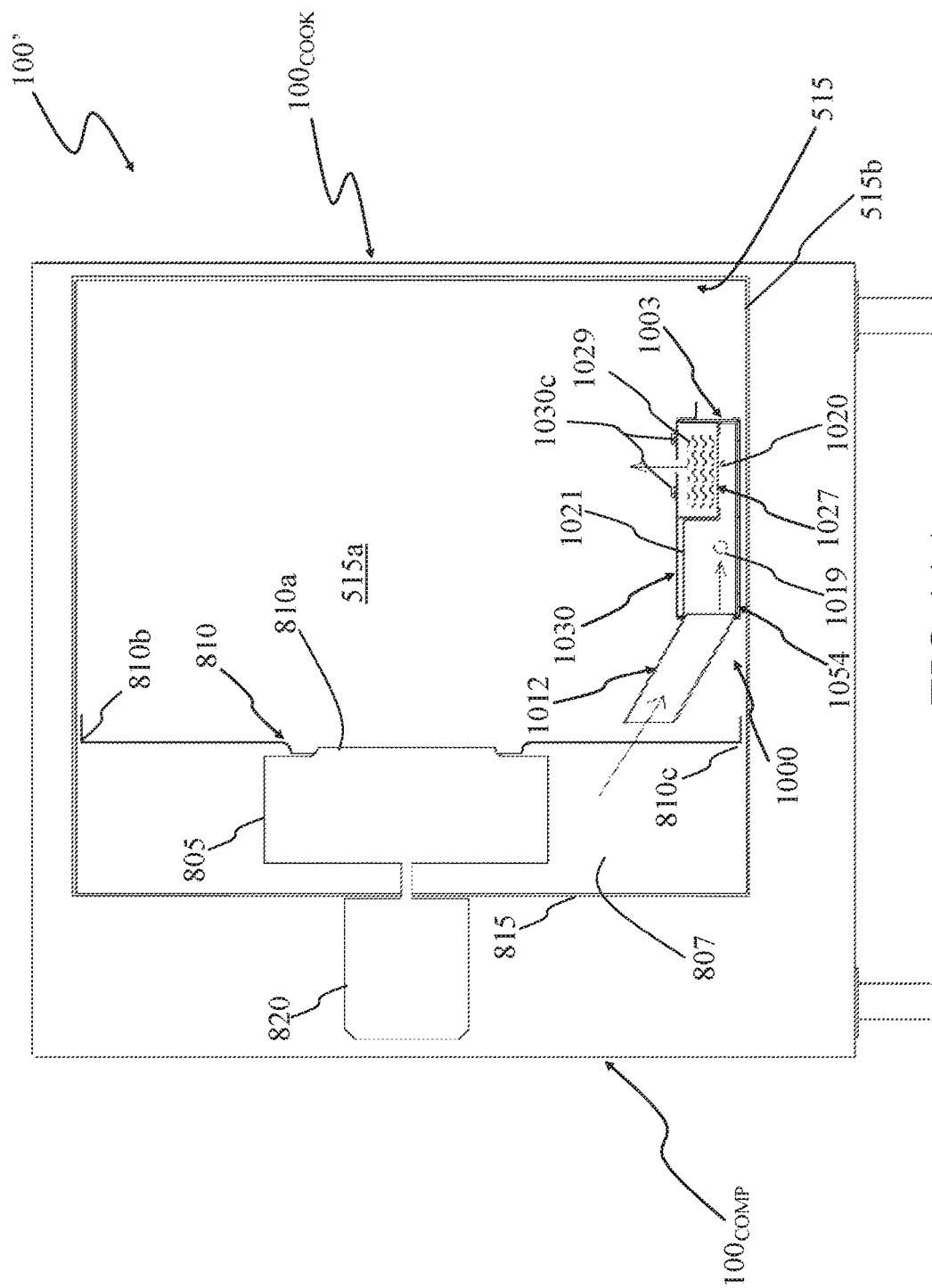
FIGS. 11A and 11B is a schematic partly cross-sectional front and top views, respectively, of a cooking oven, shown without a door, housing the flavoring device of FIGS. 10A-10G in a cooking chamber thereof.
Figure 11B:
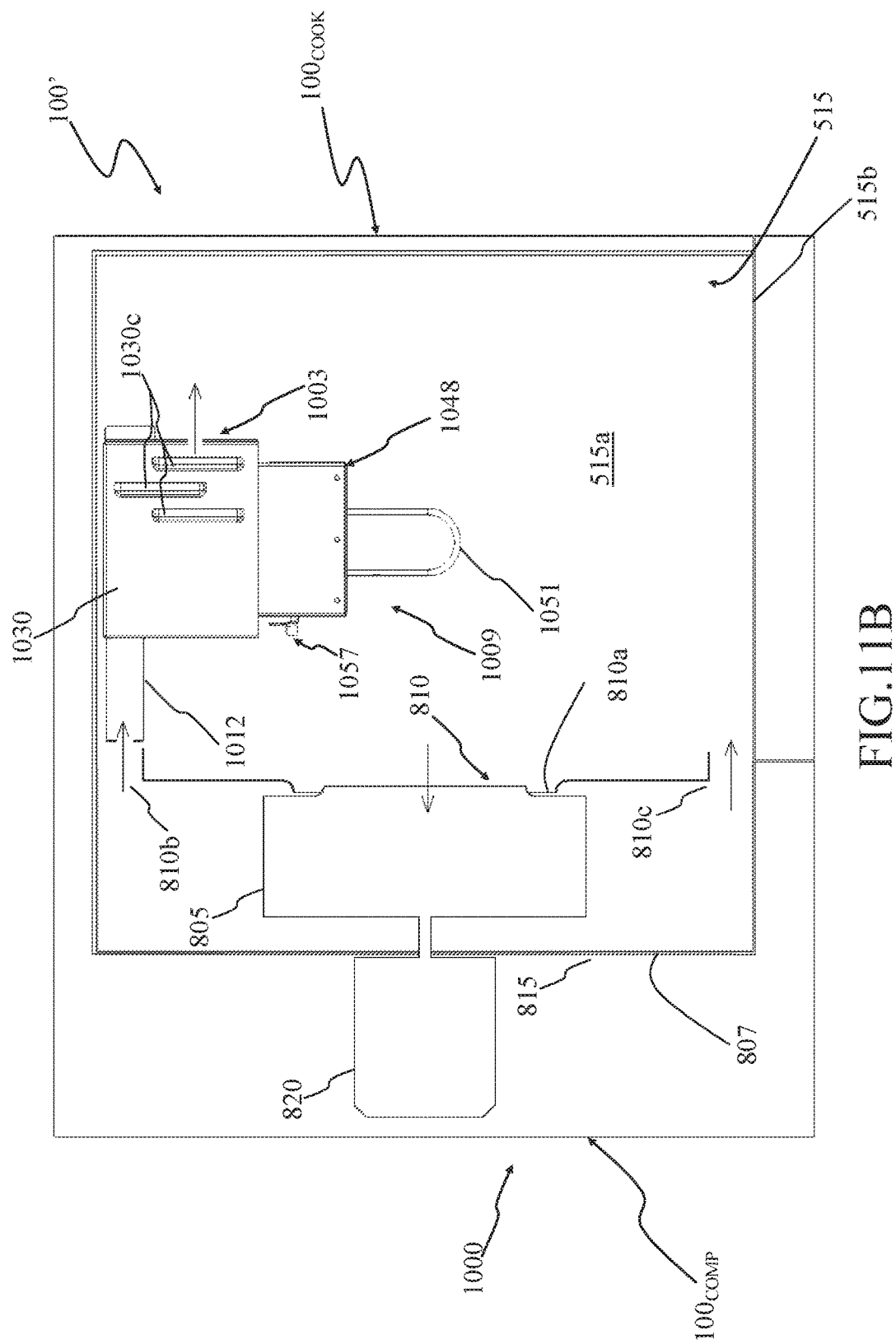

The flavoring device 1000 preferably is a stand alone structure with respect to a cooking oven, such as the cooking oven 100', with which is used as shown in FIGS. 11A and 11B.

Preferably, the flavoring device 1000 comprises a flavoring casing 1003, a smoking casing 1006 and an actuating arrangement 1009.

The flavoring casing 1003 generally comprises four sidewalls 1003a-d and a bottom wall 1003e, advantageously opposite to a main aperture 1003f of the flavoring casing 1003.

An air inlet duct 1012, e.g. a parallelepiped-shaped pipe, is provided, preferably protruding from a third sidewall 1003c of the four sidewalls 1003a-d of the flavoring casing 1003.

Preferably, the air inlet duct 1012 is transversal to the third sidewall 1003c of the casing 1003 and is in fluid communication with the inside of the casing 1003 through a first end 1012a while a second end 1012b (opposite to the first end 1012a) faces the external environment, i.e. a cooking chamber of a cooking oven, such as for example the cooking chamber 515 of the cooking oven 100', in which flavoring device 1000 may be positioned in operation, as shown in FIGS. 11A and 11B. Advantageously the second end 1012b operates as an air inlet opening for the flavoring casing 1003.

A first coupling aperture 1015 and, preferably a second coupling aperture 1018 are provided, preferably on a second sidewall 1003b of the four sidewalls 1003a-d of the flavoring casing 1003a.

The first coupling aperture 1015 is shaped and sized in such a way to receive a heating element 1019 of the actuating arrangement 1009.

The second coupling aperture 1018 is shaped and sized in such a way to receive a sensor element 1020 of the actuating arrangement 1009.

The flavoring casing 1003 preferably comprises a removable separating element 1021, which when positioned within the flavoring casing 1003, separates the space within the flavoring casing 1003 in two separated compartments 1024a and 1024b, in fluid communication one with the other.

A first separated compartment 1024a of the two separated compartments 1024a and 1024b preferably comprises the first end 1012a of the air inlet duct 1012, the first coupling aperture 1015 and the second coupling aperture 1018. Conversely, a second separated compartment 1024b of the two separated compartments 1024a and 1024b is adapted to be fitted by a flavoring substance rack 1027 (described in detail in the following)

In one embodiment of the invention, the removable separating element 1021 preferably is a plate having a step-like shape having a length substantially equal to a distance between the second sidewall 1003b and a (opposite) fourth sidewall 1003d of the four sidewalls 1003a-d of the flavoring casing 1003 (i.e., slightly smaller than a length of a first sidewall 1003a and of the sidewall 1003d of the four sidewalls 1003a-d of the flavoring casing 1003). A height of a higher tread 1021a of the removable separating element 1021 is preferably slightly smaller than the height of the four sidewalls 1003a-d of the flavoring casing 1003, while a lower tread 1021b has a height preferably slightly higher than a position of the second coupling aperture 1018 on the a second sidewall 1003b of the flavoring casing 1003.

Preferably, the lower tread 1021b of the separating element 1021 comprises an opening 1021c for allowing a fluid communication between the two separated compartments 1024a and 1024b. Even more preferably the lower tread 1021b comprises a border encircling the opening 1021c provided for supporting the flavoring substance rack 1027.

The flavoring substance rack 1027 is preferably box-like and more preferably parallelepiped shaped, advantageously with four sidewalls 1027*a-d* and a bottom wall 1027*e* opposite to a main aperture 1027*f*. The bottom wall 1027*e* of the flavoring substance rack 1027 is provided with a plurality of through bores (not shown). Preferably, the plurality of through bores covers the whole bottom wall 1027*e* of the flavoring substance rack 1027. Alternatively, the bottom wall 1027*e* may comprise a net or grid (not shown) instead of comprising a through bored plate as described above.

The flavoring substance rack 1027 is adapted to contain a flavoring substance 1063 such as for example rosemary, eucalyptus, thyme, lavender, sage, lemon balm, hop or other flavoring herbs and/or mixtures thereof.

The flavoring substance rack 1027 is advantageously adapted to removably fit the second separated compartment 1024*b* of the flavoring casing 1003, preferably resting on the border of the lower tread 1021*b* of the separating element 1021.

The flavoring casing 1003 of the flavoring device 1000 further preferably comprises a lid 1030, more preferably rotatably coupled with the rest of the flavoring casing 1003, to selectively closing the aperture 1003*f* thereof. Preferably, the lid 1030 is hinged to the second sidewall 1003*b* of the flavoring casing 1003 in order to be simply opened by a user. The lid 1030, if advantageously rotatably coupled with the flavoring casing 1003, may be pivoted from a closing position in which closes the aperture 1003*f* of the flavoring casing 1003 to an opening position that allows accessing the inside of the flavoring casing 1003.

In other advantageous embodiments of the present invention (not shown), the flavoring device comprises a lid coupled with the rest of the flavoring casing 1003 in a different manner, for example the lid 1030 may be slidably coupled with the rest of the flavoring casing 1003.

Preferably, the lid 1030 comprises a tab 1030*a*, for facilitating the user in opening the lid 1030.

Figure 10B:
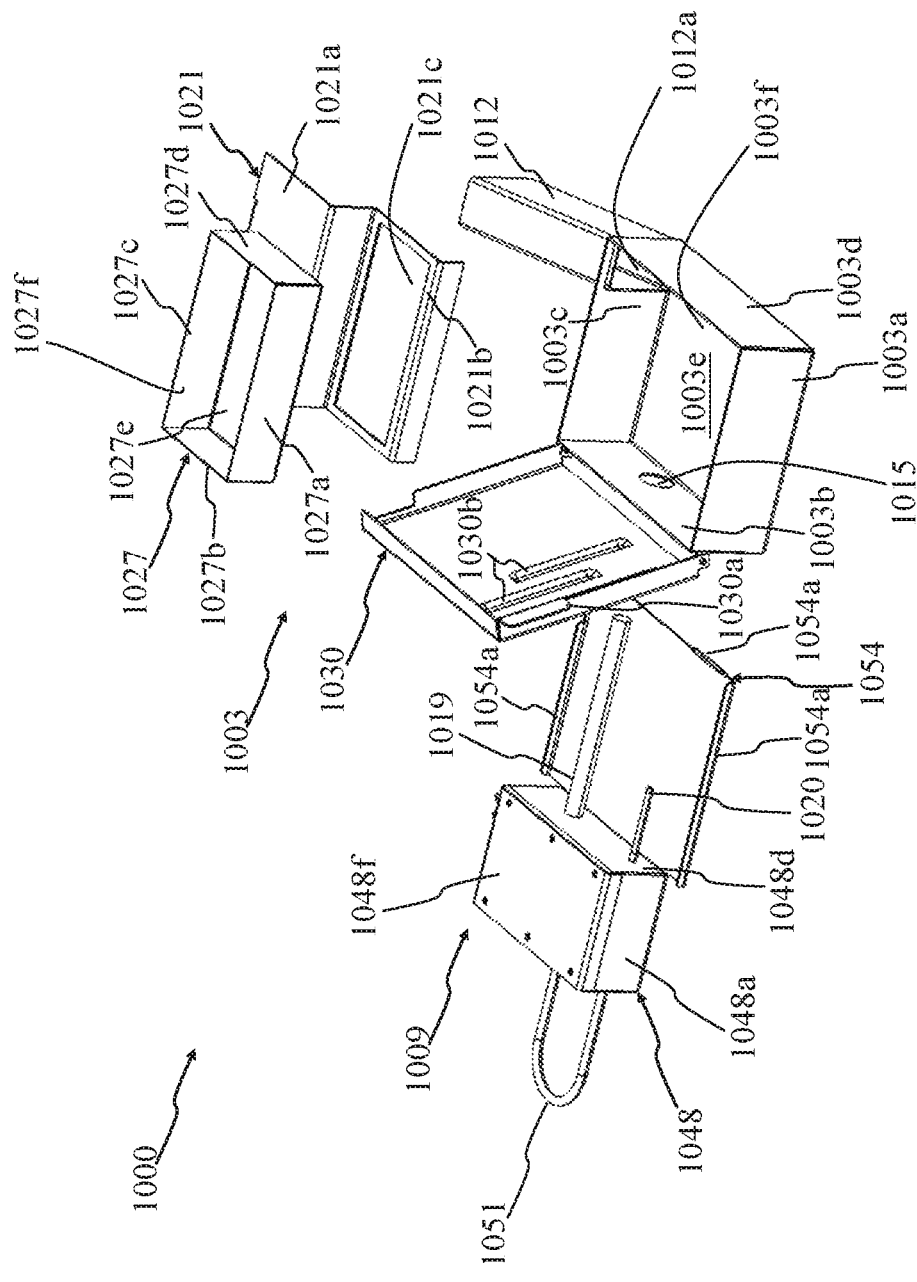
Figure 10C:
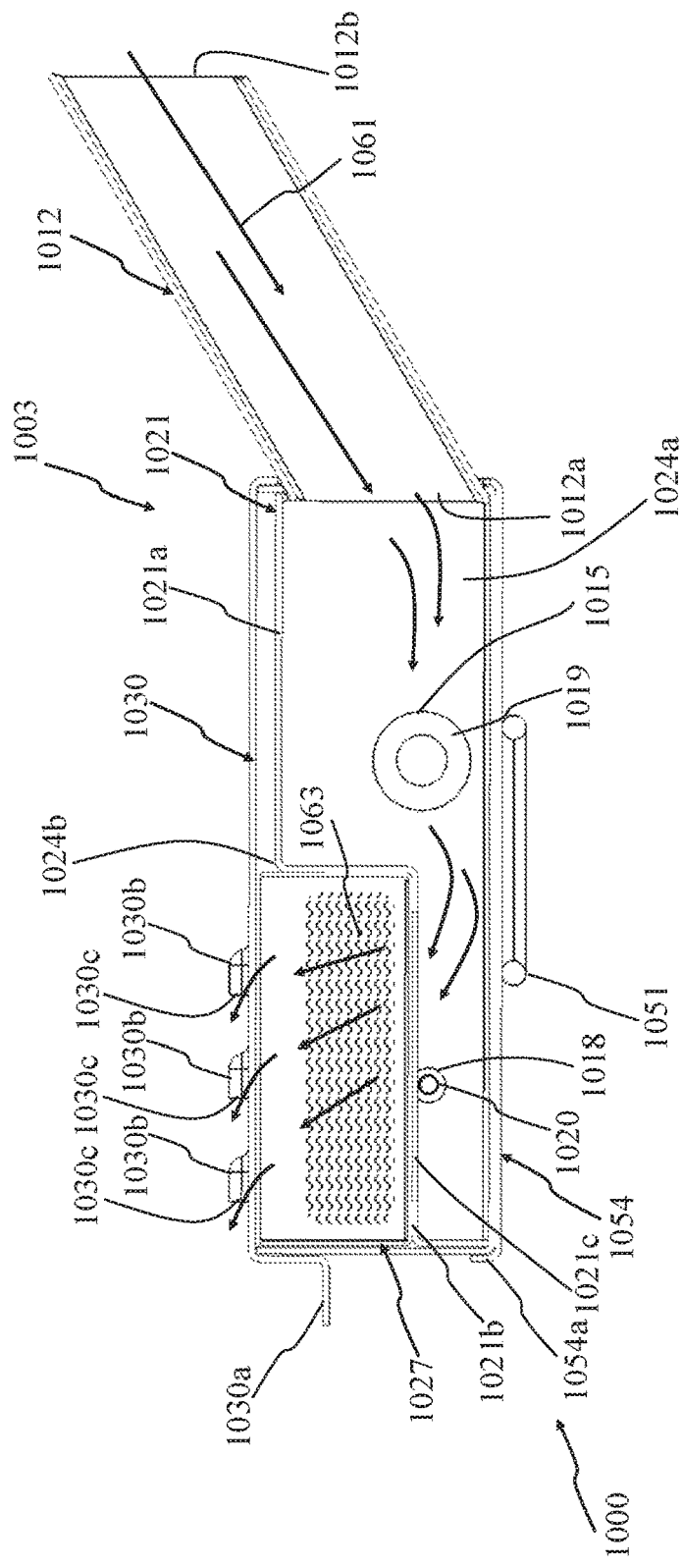

The lid 1030 may advantageously comprise one or more air outlet openings, or flavoring outlet openings 1030*b* (e.g., three flavoring outlet opening 1030*b* in example the FIGS. 10A-10C). Preferably, each flavoring outlet opening 1030*b* may comprise a respective screen element 1030*c* for preventing foreign matter from falling inside the flavoring casing 1003 when the lid 1030 is in the closing position.

Alternatively, the flavoring device 1000 may comprise an outlet duct (not shown) mounted to, or mountable to, the lid 1030 in correspondence of the flavoring outlet openings 1030*b*. such a outlet duct is arranged for providing a fluid communication between the flavoring casing 1003 of the flavoring device 1000 and a cooking chamber, such as for example the cooking chamber 515, of a cooking oven, such as for example the cooking oven 100'. As a further alternative, an alternative lid may be provided for the flavoring casing 1003 comprising a outlet aperture, instead of the outlet openings 1030*b*, configured for engaging with a corresponding end of the outlet duct. Advantageously, the provision of the outlet duct allows the flavoring device 1000 to be operated externally (i.e., outside) the cooking chamber of the cooking oven for performing a flavoring process.

The smoking casing 1006 generally comprises four sidewalls 1006*a-d* and a bottom wall 1006*e*, advantageously opposite to a main aperture 1005*f* of the smoking casing 1006.

A single coupling aperture 1033 is provided, preferably on a second sidewall 1006*b* of the of the smoking casing 1006*a*.

The single coupling aperture 1033 is shaped and sized in such a way to receive the heating element 1019 of the actuating arrangement 1009.

Preferably, air inlet openings 1036 are provided on a lower portion of two or more sidewalls 1006*a-d* of the smoking casing 1006. For example, a plurality of air inlet openings 1036 is provided on a first sidewall 1006*a* and on a third sidewall 1006*c* of the smoking casing 1006.

The smoking casing 1006 preferably comprises a removable separating element 1039, which when positioned within the smoking casing 1006, separates the space within the smoking casing 1003 in two separated compartments 1042*a* and 1042*b*, preferably in fluid communication one with the other.

A first separated compartment 1042*a* of the two separated compartments 1042*a* and 1042*b* preferably comprises coupling aperture 1033 and the air inlet openings 1036. Conversely, a second separated compartment 1042*b* of the two separated compartments 1042*a* and 1042*b* is adapted to receive the smoking substance 1066 (e.g., wood chips). In other words, the removable separating element 1039 is also used as a smoking substance rack.

In one embodiment of the invention, the removable separating element 1039 preferably is a plate having a jagged shape, such as for example a substantially sawtooth-like shape. Preferably, the removable separating element 1039 has a length substantially equal to a distance between the second sidewall 1006*b* and a (opposite) fourth sidewall 1006*d* of the smoking casing 1006 (i.e., slightly smaller than a length of a first sidewall 1006*a* and of the third sidewall 1006*c* of the smoking casing 1006). At least the height of a tooth 1039*a* of the removable separating element 1039 is preferably slightly higher than a position of the single coupling aperture 1033 on the second sidewall 1003*b* of the smoking casing 1003 in order to ensure that the heating element 1019 of the actuating arrangement 1009 is comprised within the first separated compartment 1042*a*, when inserted in the single coupling aperture 1033.

The smoking casing 1006 of the flavoring device 1000 further preferably comprises a lid 1045, more preferably rotatably coupled with rest of the flavoring casing 1006, to selectively closing the aperture 1006*f* thereof. Preferably, the lid 1045 is hinged to the second sidewall 1006*b* of the flavoring casing 1006. The lid 1045, if advantageously rotatably coupled with the smoking casing 1006, may be pivoted from a closing position in which closes the aperture 1006*f* of the smoking casing 1006 to an opening position that allows accessing the inside of the flavoring casing 1006.

In other advantageous embodiments of the present invention (not shown), the flavoring device comprises a lid coupled with the rest of the flavoring casing 1006 in a different manner, for example the lid 1045 may be slidably coupled with the rest of the flavoring casing 1006.

Preferably, the lid 1045 comprises a tab 1045*a*, for facilitating the user in opening the lid 1045.

Figure 10D:
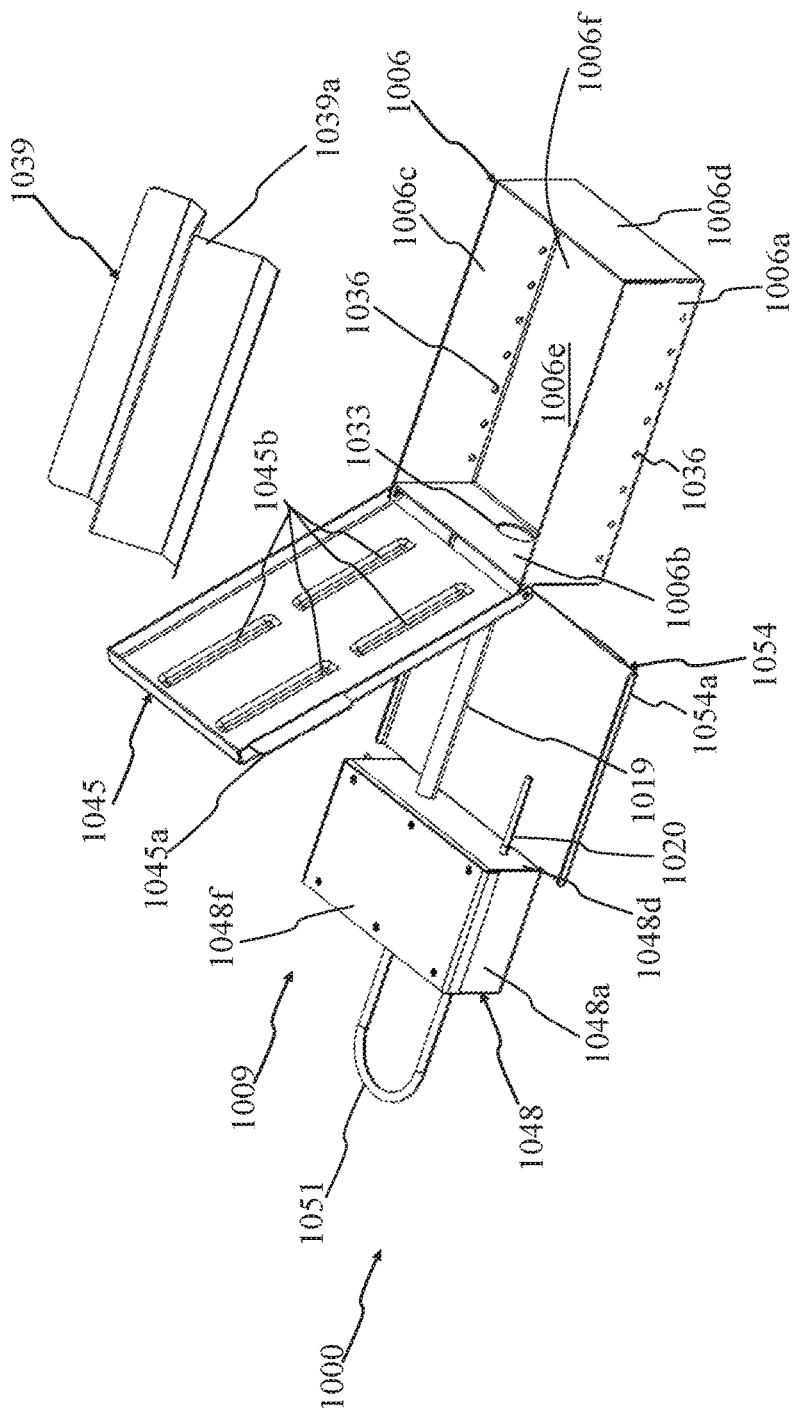
Figure 10E:
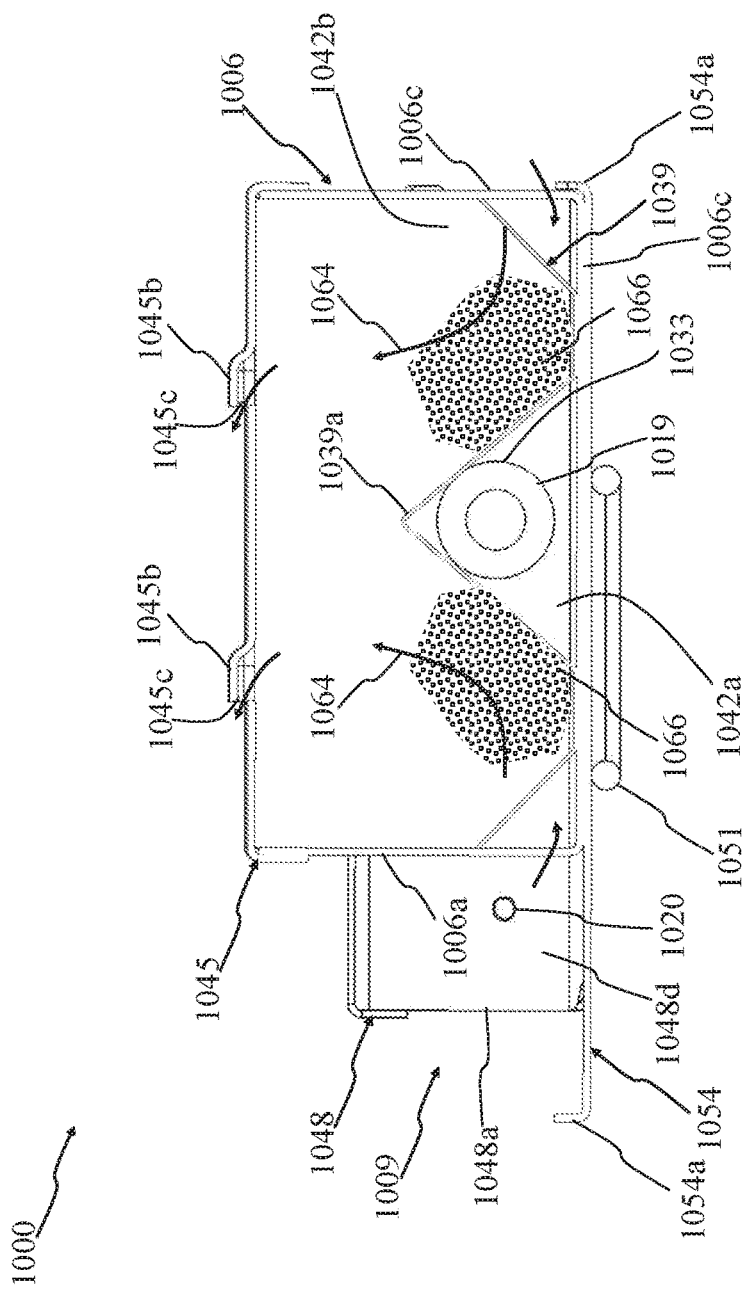

The lid 1045 may advantageously comprise one or more air outlet openings, or smoking outlet openings 1045*b* (e.g., four smoking outlet openings 1045*b* in example the FIGS. 10D and 10E). Preferably, each flavoring outlet opening 1045*b* may comprise a respective screen element 1045*c* for preventing foreign matter from falling inside the smoking casing 1006 when the lid 1045 is in the closing position.

Alternatively, the flavoring device 1000 may also comprise an outlet duct (not shown) mounted to, or mountable to, the lid 1045 in correspondence of the smoking outlet openings 1045*b*. such a outlet duct is arranged for providing a fluid communication between the smoking casing 1006 of the flavoring device 1000 and a cooking chamber, such as for example the cooking chamber 515, of a cooking oven, such as for example the cooking oven 100' as shown in. As a further alternative, an alternative lid (not shown) may be provided for the smoking casing 1006 comprising a outlet aperture, instead of the outlet openings 1045b, configured for engaging with a corresponding end of the outlet duct. Advantageously, the provision of the outlet duct allows the flavoring device 1000 to be operated externally (i.e., outside) the cooking chamber of the cooking oven for performing a smoking process.

The actuating arrangement 1009 advantageously comprises the heating element 1019 and the sensor element 1020. Preferably, although not strictly necessarily, both the heating element 1019 and the sensor element 1020 have a rod-like shape.

The heating element 1019 and the sensor element 1020 both protrude from a front sidewall 1048d of a main body 1048 of the actuating arrangement 1009.

Preferably, the main body 1048 has substantially a boxlike structure having four sidewalls 1048a-d and interposed between a bottom wall 1048e and a top wall 1048f.

Advantageously, the main body 1048 of the actuating arrangement 1009 encloses electric and electronic components adapted to selectively energizing the heating element 1019, preferably according to temperature information obtained by means of the sensor element 1020 (as described in the following).

Preferably, the main body 1048 has a structure adapted to withstand operating temperature inside the cooking chamber of the cooking oven and protect electric and electronic components that encloses from foreign bodies and overheating.

Possibly, the main body 1048 may be provided with a user interface (not shown) in order to allow a user to activate the actuating arrangement 1009 and/or set operating conditions of the flavoring device 1000.

In addition or alternatively, the main body 1048 comprises a circuitry adapted to receive settings from the user by means of radio frequency signals e.g. transmitted by a remote control unit not shown. As a further alternative the main body 1048 may be wired to an external control unit (not shown) similar to the control unit 505 described above.

Preferably, the actuating arrangement 1009 further comprises a handle element 1051 coupled with the main body 1048, for example in correspondence of a lower portion of the main body 1048. The handle element 1051 is advantageously in order to allow a secure seizure of the flavoring device actuating arrangement 1009 by a user. In one embodiment of the present invention, the handle element 1051 is removably coupled with the main body of the actuating arrangement 1009.

Preferably, the actuating arrangement 1009 further comprises a support element, such as for example a plate element 1054, coupled with the main body 1048 of the actuating arrangement 1009 for supporting the flavoring casing 1003 or the smoking casing 1006. Even more preferably, the plate element 1054 is coupled with the main body 1048 of the actuating arrangement 1009 in correspondence of a lower portion of the front sidewall 1048d of the main body 1048.

Preferably, the plate element 1054 has a substantially rectangular shape in plan view. Even more preferably, the plate element 1054 has a size in plan view substantially corresponding to the bottom wall of one between the flavoring casing 1003 or the smoking casing 1006. In the example of the FIGS. 10A-10G, the plate element 1054 has a size in plan view substantially corresponding to the bottom wall 1003e of the flavoring casing 1003.

Advantageously, the plate element 1054 comprises border elements 1054a, transversal to a main portion of the plate element 1054, adapted to ensure a more stable support for the casing having the bottom wall with substantially the same size of the plate element 1054 (e.g., flavoring casing 1003).

Preferably, the main body 1048 of the actuating arrangement 1009 further comprises a locking element 1057 adapted to engage with loop elements respectively provided on the flavoring casing 1003 and the smoking casing 1006.

Advantageously, the locking element 1057 is rotatably provided on an outer surface of a lateral sidewall 1048c of the main body 1048 of the actuating arrangement 1009.

Figure 10F:
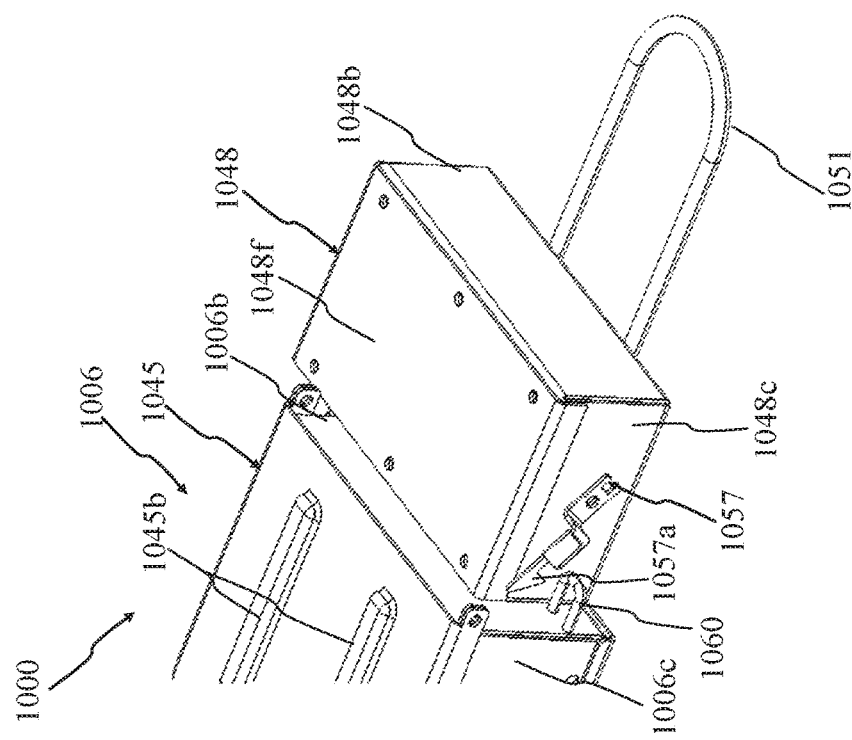
Figure 10G:
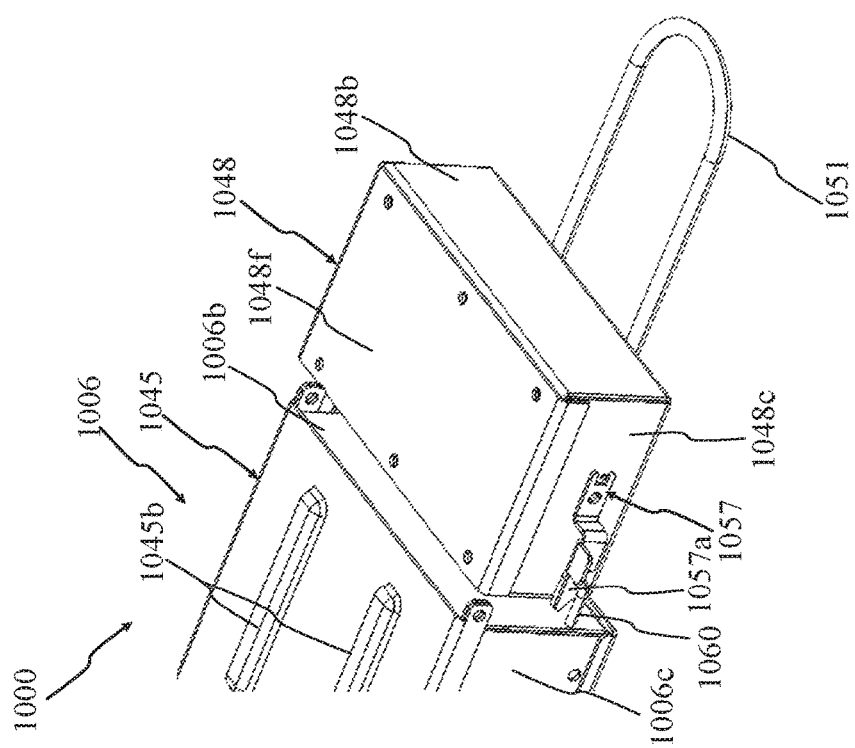

Preferably, the locking element 1057 comprises a hooked end 1057a, adapted to engage with a corresponding receiving element advantageously provided on an outer surface of the second walls 1003b and 1006b of both the flavoring casing 1003 and the smoking casing 1006, such as for example a loop element 1060 of the provided on an outer surface of the second wall 1006b of the smoking casing 1006 as shown in FIGS. 10F and 10G.

Advantageously, when one between the flavoring casing 1003 and the smoking casing 1006 is positioned on the plate element 1054 with the respective second wall 1003b or 1006b abutting against the front sidewall 1048d of the main body 1048, the locking element 1057 may be pivoted from a closing position in which hooked end 1057a engage with the corresponding loop element, such as the loop element 1060 of the smoking casing 1006 firmly coupling the actuating arrangement 1009 with the smoking casing 1006, to an opening position in which releases the corresponding loop element, such as the loop element 1060.

The flavoring device 1000 is preferably made of a heat resistant material (i.e., a material that is not deformed and/or damaged at the operating temperatures of the cooking oven). For example, the flavoring device 1000 may be made of a metal, such as steel. In this case, the parts of the flavoring casing 1003, the smoking casing 1006 and the actuating arrangement 1009 (apart the sensing element and the electric and electronic circuitry comprised in the actuating arrangement 1009), may be manufactured by cutting, punching and folding metal sheets, thus with a cheap and fast manufacturing procedure.

In operation, the flavoring device 1000 may be advantageously positioned inside the cooking chamber of a cooking oven, such as for example the cooking oven 100', for example resting on the bottom wall 515b of the cooking chamber 515 as shown in FIG. 11A or, alternatively, the flavoring device 1000 may be positioned on a cooking plate (not shown) or even hanged to a sidewall of the cooking chamber. Alternatively or in addition, the flavoring device 1000 may be advantageously positioned inside the cooking chamber of a cooking oven, such as for example the cooking oven 100', for example attached to a rear wall 515a of the cooking chamber 515 as shown in FIG. 11B.

Advantageously, the flavoring device 1000 comprising the flavoring casing 1003 may be positioned within the cooking chamber 515 of the cooking oven 100' in such a way that the second end 1012b of the air inlet duct 1012 is preferably directed towards one of the bottom air passages 810b and/or 810c providing a forced airflow through the flavoring device 1000 as shown in the FIGS. 11A and 11B.

Advantageously, according to whether a flavoring process or a smoking process is to be performed, the flavoring casing 1003 or the smoking casing 1006, respectively, is associated with the actuating arrangement 1009. Preferably, the flavoring casing 1003 or the smoking casing 1006 are slid over the plate element 1054 until the respective second sidewall 1003b or 1006b abuts against the front sidewall 1048b of the main body 1048 of the actuating arrangement 1009.

Advantageously, if the flavoring casing 1003 is selected, the heating element 1019 and the sensing element 1020 are received inside the flavoring casing 1003 through the first coupling aperture 1015 and the second coupling aperture 1018, respectively. Conversely, if the smoking casing 1006 is selected, only the heating element 1019 is received inside the smoking casing 1006 through the coupling aperture 1033, while the sensing element 1020 remains outside the smoking casing 1006 thanks to a width of the smoking casing 1006 that is advantageously formed to be shorter than a distance d between a border 1054a (closer to the heating element 1019 than to the sensing element 1020) of the plate element 1054 and the sensing element 1020.

With the second sidewall 1003b or 1006b of the flavoring casing 1003 or the smoking casing 1006, respectively, abutting against the front sidewall 1048b of the main body 1048 of the actuating arrangement 1009, the locking element 1057 may be advantageously switched from the opening position to the closing position in which the hooked end 1057a engages the loop element 1060 provided on the outer surface of the second sidewall 1003b or 1006b of the flavoring casing 1003 or the smoking casing 1006, respectively.

In a flavoring process, the flavoring casing 1003 receives the heating element 1019 and the sensing element 1020 through the first coupling aperture 1015 and the second coupling aperture 1018, respectively, and the removable separating element 1021 is provided in the flavoring casing 1003 with the flavoring substance rack 1027 positioned on the lower tread 1021b of the separating element, and with the lid 1030 of the flavoring casing 1003 in the closing position. Thus the sensing element 1020 is in proximity of the flavoring substance rack 1027 while the heating element 1019 is substantially spaced apart therefrom.

Advantageously, a flavoring air path 1061 (as visible in FIG. 10C) is formed between the second end 1012b of the air inlet duct 1012 (i.e. the air inlet opening of the flavoring casing) and the flavoring outlet openings 1030b provided in the lid 1030 of the flavoring casing 1003. Preferably the first end 1012a of the air inlet duct 1012 is arranged in such a way to route the flow of air entering the flavoring casing 1003 in proximity of the heating element 1019.

Advantageously, the flavoring air path extends from the air inlet opening 1012b trough the air inlet duct 1012 and therefrom into the first compartment 1024a, where the air flow is directed first against the heating element 1019 (to be heated when the heating element 1019 is actuated), and then the air flow reaches the second compartment 1024b passing in the surroundings of the sensing element 1020 and through the aperture 1021c and through the bottom wall 1027f of the flavoring substance rack 1027, and therefore passing through any flavoring substance 1063 positioned in the flavoring substance rack 1027 before reaching the flavoring outlet openings 1030b provided in the lid 1030 and exiting the flavoring casing 1003 therethrough.

Similarly, in a smoking process, the smoking casing 1006 receives the heating element 1019 through the coupling aperture 1033, and the removable separating element 1039 is provided in the smoking casing 1006, and with the lid 1045 of the smoking casing 1006 in the closing position.

Advantageously, a smoking air path (as visible in FIG. 10E) is formed between the air inlet openings 1036 and the smoking outlet openings 1045b provided in the lid 1045 of the smoking casing 1003.

Advantageously, the smoking air path extends from the air inlet openings 1036 into the first compartment 1042a, where the air flow reaches the second compartment 1042b and through gaps (not detailed in the drawings) between the removable separating element 1039 and the inner surfaces of the sidewalls 1006a-d of the smoking casing 1006. In the second compartment 1042b the air flow passes through any smoking substance 1066 (being charred by the heating element 1019 when actuated) positioned on the removable separating element 1039 before reaching the smoking outlet openings 1045b provided in the lid 1045 and exiting the smoking casing 1006 therethrough.

In both the favoring casing 1003 and the smoking casing 1006 the flow of air during the flavoring process and the smoking process, respectively, is mainly due to convection promoted by the heat generated by the heating element 1019 of the actuating arrangement 1009. Advantageously, during the flavoring process the air in the flavoring casing 1003 is first heated by the heating element 1019 and then passes through the flavoring substance(s) contained in the flavoring substance rack 1027 volatilizing or vaporizing flavoring molecules thereof before exiting from the flavoring casing 1003 into the cooking chamber of the cooking oven. Conversely, during the smoking process the smoking substance positioned on the removable separating element 1039 is substantially charred by the heat transmitted by the heating element 1019 (i.e., by radiation) to the removable separating element 1039; the same heat generated by the heating element 1019 promotes the flow of air from the inlet openings 1036 to the smoking outlet openings 1045b that provides the diffusion of the smoke generated by the charred smoking substance out of the smoking casing 1006 into the cooking chamber of the cooking oven.

Advantageously, the flavoring device 1000 featuring two distinct casings, i.e. the flavoring casing 1003 and the smoking casing 1006, ensures that process remainders of one between the flavoring process and the smoking process do not have any influence on future smoking processes and flavoring processes, respectively. For example, the flavors provided by the flavoring process performed by means of the flavoring device 1000 is not altered by any residual soot remaining after a previously performed smoking process.

A method of operating the flavoring device 1000 according to an embodiment of the present invention differs from the method of operating the flavoring device 400 described above with reference to FIG. 9, in what follows.

Initially, the flavoring device 1000 is positioned inside the cooking chamber (such as the cooking chamber 515) of the cooking oven (such as the cooking oven 100') together with the food to be processed.

If the flavoring process is going to be performed, the flavoring device 1000 comprises the actuating arrangement 1009 and the flavoring casing 1003. it should be noted that the flavoring casing 1003 may be coupled with the actuating arrangement 1009 either before or after that the actuating arrangement 1009 is placed in the cooking chamber of the cooking oven.

Advantageously, the flavoring casing 1003 is placed on the plate element 1054 with the heating element 1019 and the sensing element 1020 inserted into the flavoring casing 1003 through the first coupling aperture 1015 and the second coupling aperture 1018, respectively. Preferably, the flavoring casing 1003 is locked to the actuating arrangement 1009 by engaging the locking element 1057 with the loop element 1060, as described above.

Advantageously the flavoring substance(s) 1063 may be provided in the flavoring substance rack 1027 before or after the positioning of the flavoring device 1000, or only of the flavoring casing 1003, into the cooking chamber.

Conversely, if a smoking process is to be performed, the flavoring device 1000 comprises the actuating arrangement 1009 and the smoking casing 1006. it should be noted that the smoking casing 1006 may be coupled with the actuating arrangement 1009 either before or after that the actuating arrangement 1009 is placed in the cooking chamber of the cooking oven.

Advantageously, the smoking casing 1006 is placed on the plate element 1054 with the heating element 1019 inserted into the smoking casing 1006 through the coupling aperture 1033. Preferably, the smoking casing 1003 is locked to the actuating arrangement 1009 by engaging the locking element 1057 with the loop element 1060, as described above.

Advantageously the smoking substance(s) 1066 may be provided on the removable separating element 1039 before or after the positioning of the flavoring device 1000, or only of the smoking casing 1006, into the cooking chamber.

The following steps of the operating method substantially correspond to the step of the operating method described above with reference to FIG. 9 that are not herein repeated for the sake of conciseness.

Thanks to the flavoring devices 200, 400 and 1000 the control method according to the present invention it is possible to perform the flavoring process and/or the smoking process of food independently from a cooking process of the same food. Particularly, it is possible to perform the flavoring process and/or the smoking process of food either before or after the cooking process of the same food.

Therefore, the flavoring devices 200, 400 and 1000 and the control method according to the present invention provide functionalities of both smoking and flavoring foods (either performed as combined functionalities or as independent functionalities) for the cooking ovens 100 and 100'.

The invention claimed is:

1. A flavoring device adapted to be associated with a cooking chamber of a cooking oven adapted to cook food stored therein, the flavoring device comprising:
   a flavoring casing having a first air inlet opening arranged for allowing air to enter said flavoring casing, a flavoring air outlet opening arranged for allowing air contained within said flavoring casing to pass to said cooking chamber, and a flavoring air path traversing said flavoring casing and fluidly connecting said first air inlet opening to said flavoring air outlet opening; and
an actuating arrangement comprising a heating element and a temperature sensor, said actuating arrangement being coupled to said flavoring casing at least while in operation so that said heating element is arranged in said flavoring air path for heating the air flowing through said flavoring air path, said flavoring casing, further comprising a removable flavoring substance rack arranged at least partially in said flavoring air path downstream of said heating element and adapted to contain at least one flavoring substance,
   wherein the heating element is spaced apart from the flavoring substance rack in operation such that heat is transferred from said heating element to said flavoring substance rack mainly by air flowing inside the flavoring casing from the first air inlet opening to the flavoring air outlet opening through said flavoring air path.

2. The flavoring device according to claim 1, wherein said flavoring casing houses, at least while in operation, the temperature sensor positioned in correspondence of the flavoring substance rack and spaced apart from said heating element.

3. The flavoring device according to claim 1, wherein said flavoring casing further comprises at least one air inlet duct protruding from said flavoring casing, said air inlet duct comprising the first air inlet opening and being arranged for allowing air to enter said flavoring casing.

4. A flavoring device adapted to be associated with a cooking chamber of a cooking oven adapted to cook food stored therein, the flavoring device comprising:
   a flavoring casing having a first air inlet opening arranged for allowing air to enter said flavoring casing, a flavoring air outlet opening arranged for allowing air contained within said flavoring casing to pass to said cooking chamber, and a flavoring air path traversing said flavoring casing and fluidly connecting said first air inlet opening to said flavoring air outlet opening;
   a heating element that is, at least while said flavoring casing is in operation, arranged in said flavoring air path for heating the air flowing through said flavoring air path;
   a flavoring substance rack arranged at least partially in said flavoring air path downstream of said heating element and adapted to contain at least one flavoring substance, wherein the heating element is spaced apart from the flavoring substance rack in operation such that heat is transferred from said heating element to said flavoring substance rack mainly by air flowing inside the flavoring casing from the first air inlet opening to the flavoring air outlet opening through said flavoring air path;
   a smoking casing having a second air inlet opening arranged for allowing air external to said smoking casing to enter said smoking casing, a smoking air outlet opening arranged for allowing air contained within said smoking casing to pass to said cooking chamber, and a smoking air path traversing said smoking casing and fluidly connecting said second air inlet opening to said smoking air outlet opening; and
   a smoking substance rack arranged for receiving a smoking substance, said smoking substance rack being arranged at least partially in said smoking air path in operation such that, during operation, the heating element is arranged for charring said smoking substance, the smoking substance rack being positioned in correspondence of said heating element in such a way that, in operation, heat is transferred from said heating element to said smoking substance rack mainly by radiation.

5. The flavoring device according to claim 4, wherein said smoking casing is interchangeable with said flavoring casing in the flavoring device.

6. The flavoring device according to claim 4, wherein the smoking substance rack is arranged for subdividing an inner space of said smoking casing into a first compartment and a second compartment, said first compartment housing, at least while in operation, said heating element, and said second compartment housing, at least while in operation, said smoking substance.

7. The flavoring device according to claim 1, wherein the actuating arrangement is configured for selectively controlling the operation of the heating element on the basis of temperature measurements obtained from the temperature sensor.

8. The flavoring device according to claim 1, wherein the actuating arrangement further comprises a support element for supporting the flavoring casing.

9. The flavoring device according to claim 1, wherein the actuating arrangement further comprises a locking element and wherein the flavoring casing further comprises a receiving element, the locking element being configured for engaging with the receiving element for firmly coupling the actuating arrangement with the flavoring casing.

10. The flavoring device according to claim 1, wherein the flavoring casing comprises a first coupling aperture for receiving, when in operation inside or outside the cooking chamber of a cooking oven and in fluid communication with the cooking chamber of the cooking oven, the heating element.

11. The flavoring device according to claim 10, wherein the flavoring casing comprises a second coupling aperture for receiving, when in operation, the temperature sensor.

12. The flavoring device according to claim 1, further comprising at least one outlet duct coupled with the flavoring casing at least while in operation, said outlet duct being configured for fluidly connecting the flavoring casing with the cooking chamber of the cooking oven.

13. A method of controlling a flavoring device, the method comprising:
   providing or obtaining a flavoring device comprising:
      a flavoring casing having a first air inlet opening arranged for allowing air to enter said flavoring casing, a flavoring air outlet opening arranged for allowing air contained within said flavoring casing to pass to a cooking chamber of a cooking oven, and a flavoring air path traversing said flavoring casing and fluidly connecting said first air inlet opening to said flavoring air outlet opening; and
      an actuating arrangement comprising a heating element and a temperature sensor, said actuating arrangement being coupled to said flavoring casing at least while in operation so that said heating element is arranged in said flavoring air path for heating the air flowing through said flavoring air path, said flavoring casing further comprising a removable flavoring substance rack arranged at least partially in said flavoring air path downstream of said heating element and adapted to contain at least one flavoring substance;
      wherein the heating element is spaced apart from the flavoring substance rack in operation such that heat is transferred from said heating element to said flavoring substance rack mainly by air flowing inside the flavoring casing from the first air inlet opening to the flavoring air outlet opening through said flavoring air path;
   providing the at least one flavoring substance in said flavoring air path; and
   heating the air in said flavoring air path upstream of said at least one flavoring substance, in such a way that heated air, moving through said flavoring air path, heats said at least one flavoring substance, so as to volatilize/vaporize its flavoring molecules, and takes volatilized/vaporized flavoring molecules into said cooking chamber via said flavoring air outlet opening.

14. The method according to claim 13, further comprising the steps of:
   detecting a temperature of the air in said flavoring air path; and
   controlling the heating of the air in said flavoring air path according to the detected temperature of the air in said flavoring air path.

15. A flavoring device adapted to be associated with a cooking chamber of a cooking oven adapted to cook food stored therein, the flavoring device comprising:
   a flavoring casing having a first air inlet opening arranged for allowing air to enter said flavoring casing, a flavoring air outlet opening arranged for allowing air contained within said flavoring casing to pass therefrom, a flavoring air path traversing said flavoring casing and fluidly connecting said first air inlet opening to said flavoring air outlet opening, and a flavoring substance rack arranged in said flavoring air path, said flavoring substance rack adapted to receive a flavoring substance;
   a smoking casing having a second air inlet opening arranged for allowing air external to said smoking casing to enter said smoking casing, a smoking air outlet opening arranged for allowing air contained within said smoking casing to pass therefrom, a smoking air path traversing said smoking casing and fluidly connecting said second air inlet opening to said smoking air outlet opening, and a smoking substance rack adapted to receive a smoking substance, said smoking substance rack being arranged in said smoking air path; and
   a heating element;
   said flavoring casing and said smoking casing being interchangeable such that: a) said flavoring casing is installable so that said heating element is at least partially disposed in said flavoring casing during a flavoring operation, and b) said smoking casing is installable so that said heating element is disposed in said smoking casing during a smoking operation, wherein:
      when said flavoring casing is installed, the flavoring substance rack is arranged downstream of said heating element and spaced apart therefrom such that heat is transferred from said heating element to said flavoring substance rack mainly by air flowing inside the flavoring casing from the first air inlet opening to the flavoring air outlet opening through said flavoring air path, and
      when said smoking casing is installed, the smoking substance rack is positioned in correspondence of said heating element in such a way that heat is transferred from said heating element to said smoking substance rack mainly by radiation for charring said smoking substance.

* * * * *